United States Patent
Maetaki

(10) Patent No.: US 9,557,543 B2
(45) Date of Patent: Jan. 31, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Satoshi Maetaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 14/610,248

(22) Filed: Jan. 30, 2015

(65) Prior Publication Data

US 2015/0234166 A1    Aug. 20, 2015

(30) Foreign Application Priority Data

Feb. 14, 2014 (JP) ................................. 2014-026486

(51) Int. Cl.
  *G02B 15/14* (2006.01)
  *G02B 15/173* (2006.01)
  *G02B 7/38* (2006.01)

(52) U.S. Cl.
  CPC .............. *G02B 15/173* (2013.01); *G02B 7/38* (2013.01)

(58) Field of Classification Search
  CPC ..... G02B 15/173; G02B 15/14; G02B 27/646; G02B 15/16; G02B 15/20
  USPC ................................. 359/676–704, 811–830
  See application file for complete search history.

(56) References Cited

U.S. PATENT DOCUMENTS

| | | | | |
|---|---|---|---|---|
| 6,671,103 B2* | 12/2003 | Itoh | ...................... | G02B 15/177 359/676 |
| 7,064,903 B2* | 6/2006 | Yakita | .................. | G02B 15/173 359/684 |
| 8,767,313 B2* | 7/2014 | Shimomura | ......... | G02B 15/167 359/687 |
| 2005/0219712 A1 | 10/2005 | Yakita | | |

FOREIGN PATENT DOCUMENTS

| | | |
|---|---|---|
| CN | 1162727 C | 8/2004 |
| CN | 101995646 A | 3/2011 |
| JP | 2003-295060 A | 10/2003 |
| JP | 2009-251114 A | 10/2009 |
| JP | 2012-247687 A | 12/2012 |

OTHER PUBLICATIONS

Chinese Office Action issued in corresponding application CN 201510069278.9 on Sep. 5, 2016.

* cited by examiner

*Primary Examiner* — Mohammed Hasan
(74) *Attorney, Agent, or Firm* — Carter, DeLuca, Farrell & Schmidt, LLP

(57) ABSTRACT

Provided is a zoom lens including a plurality of lens units, in which an interval between adjacent lens units changes during zooming. The zoom lens includes: a first lens subunit having a positive refractive power; a second lens subunit having a positive refractive power, which is arranged adjacent to an image side of the first lens subunit; and at least one lens unit on an object side of the first lens subunit. Lens systems arranged on the object side of the first lens subunit have a negative combined focal length over an entire zoom range. The second lens subunit moves along an optical axis to the image side during focusing from an object at infinity to a proximate object. A focal length of the first lens subunit and a focal length of the second lens subunit are appropriately set.

13 Claims, 19 Drawing Sheets

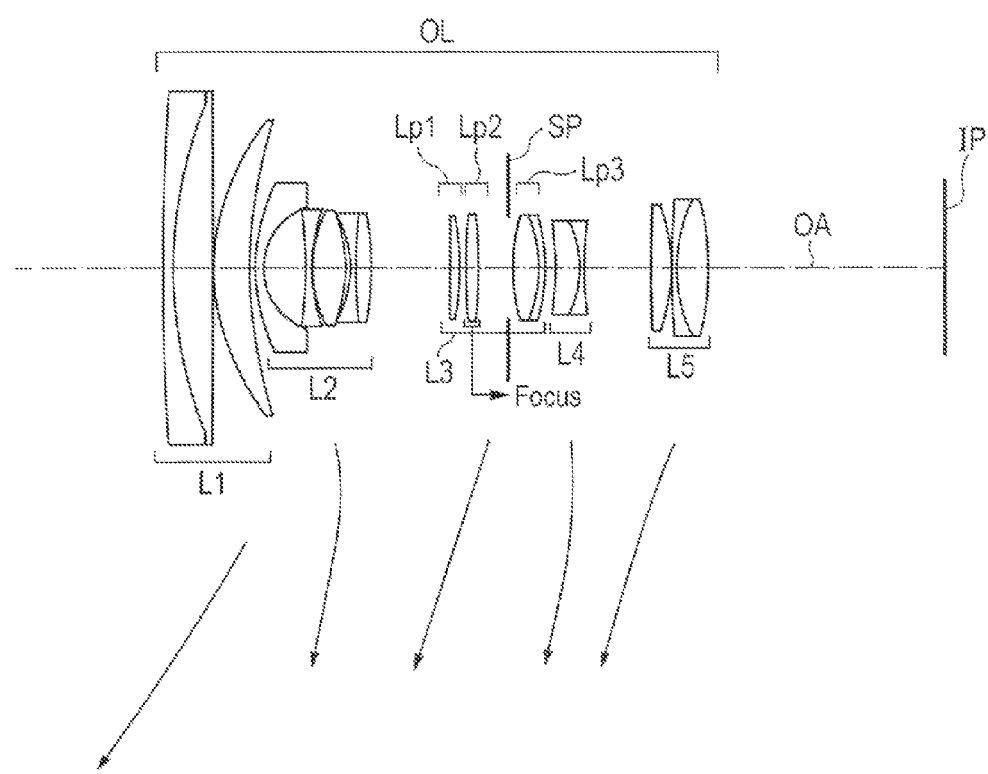

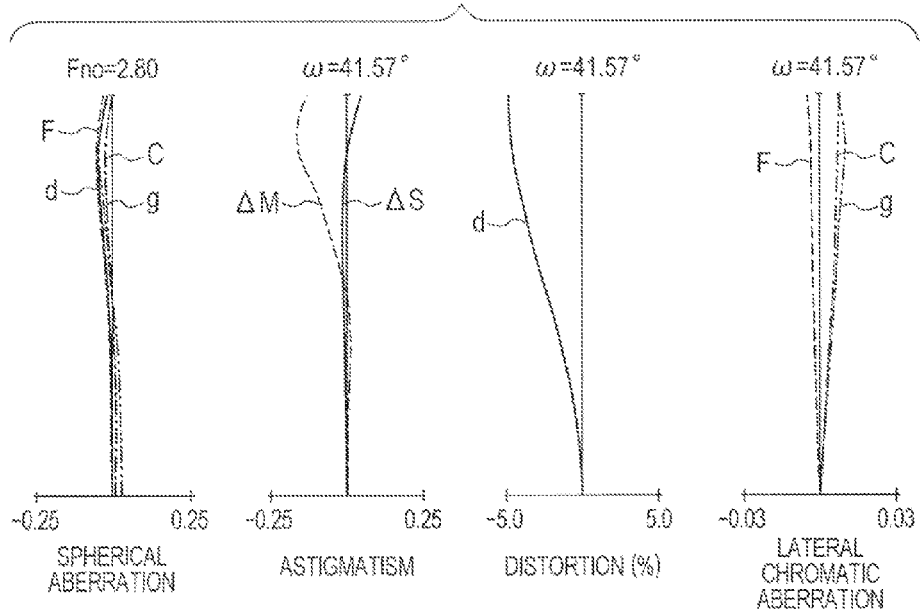
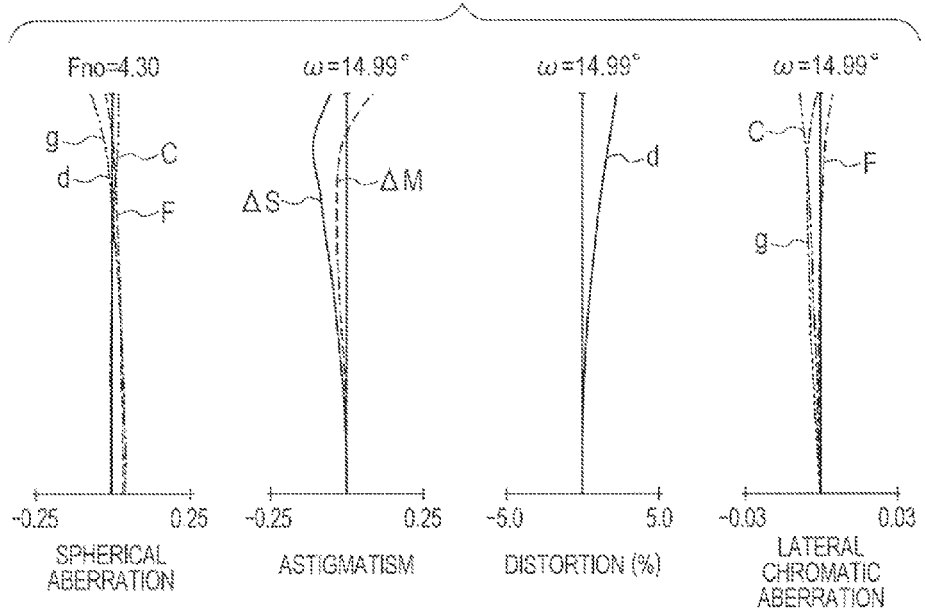

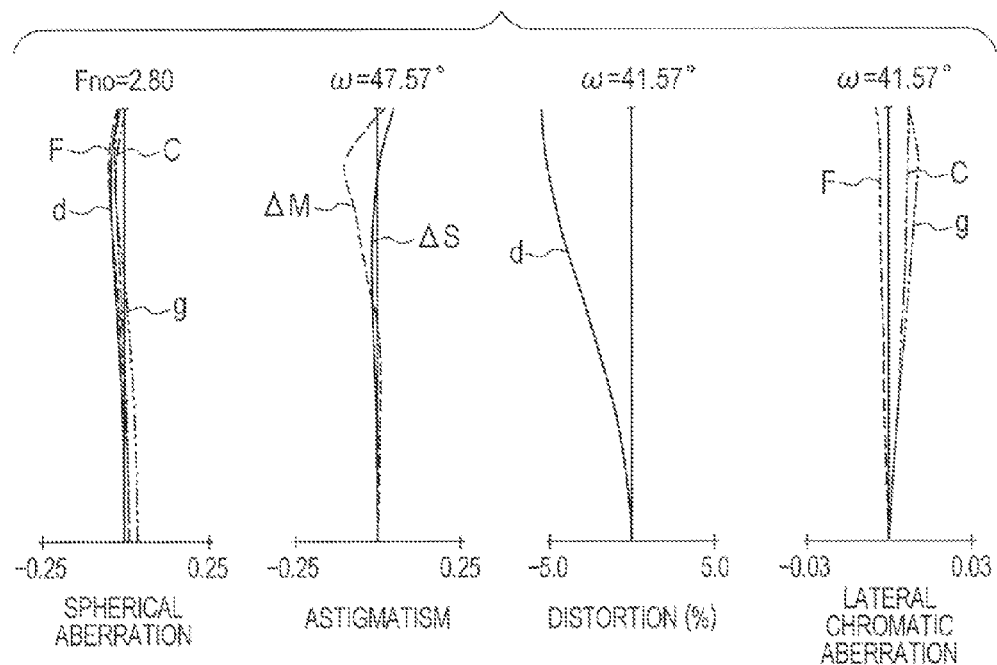
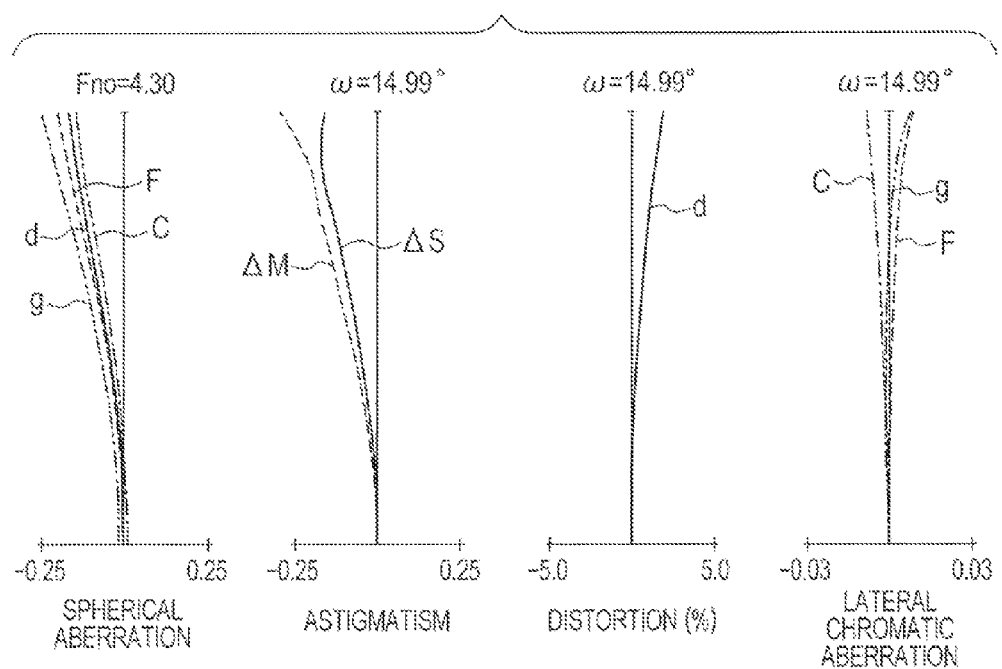

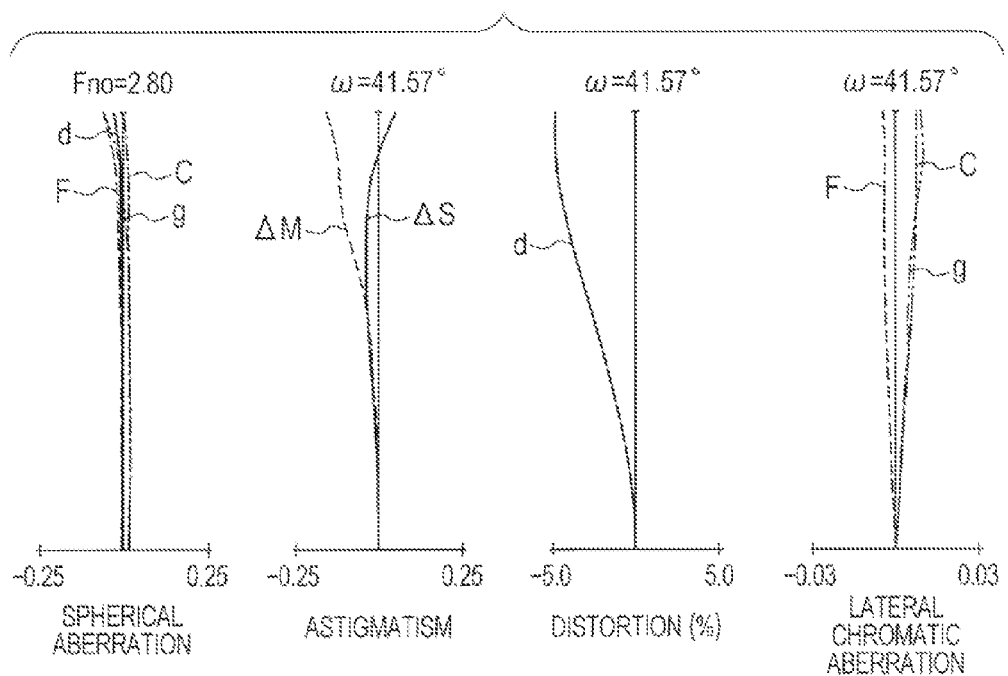
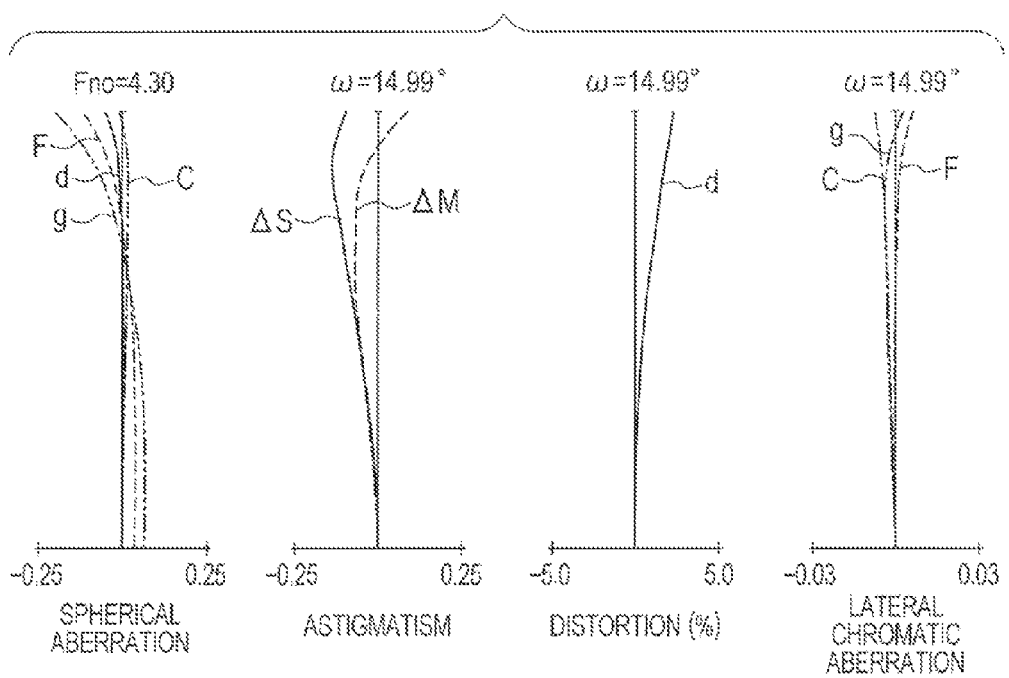

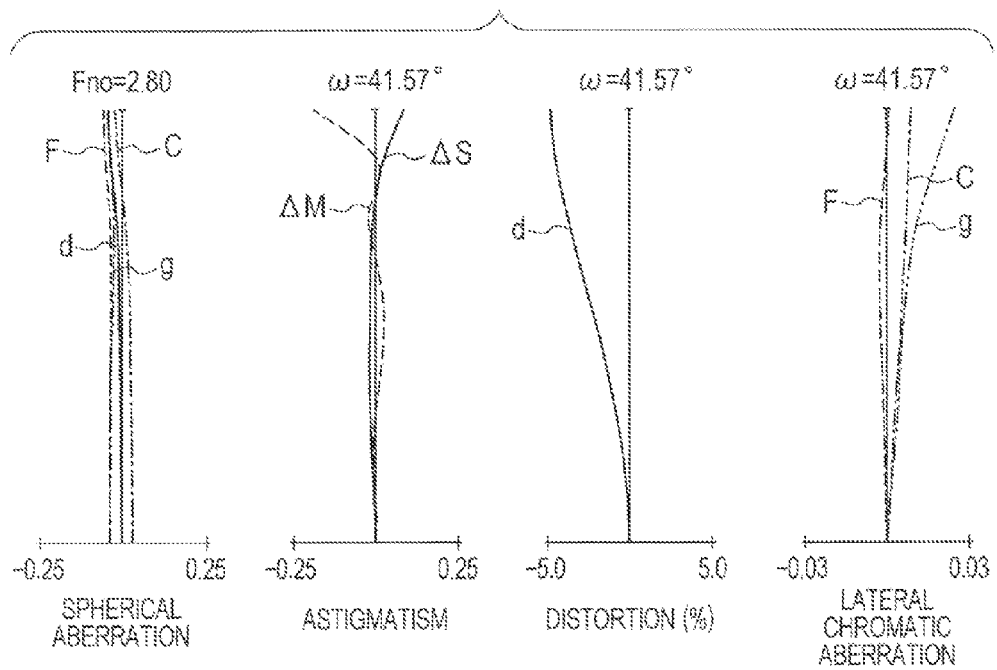
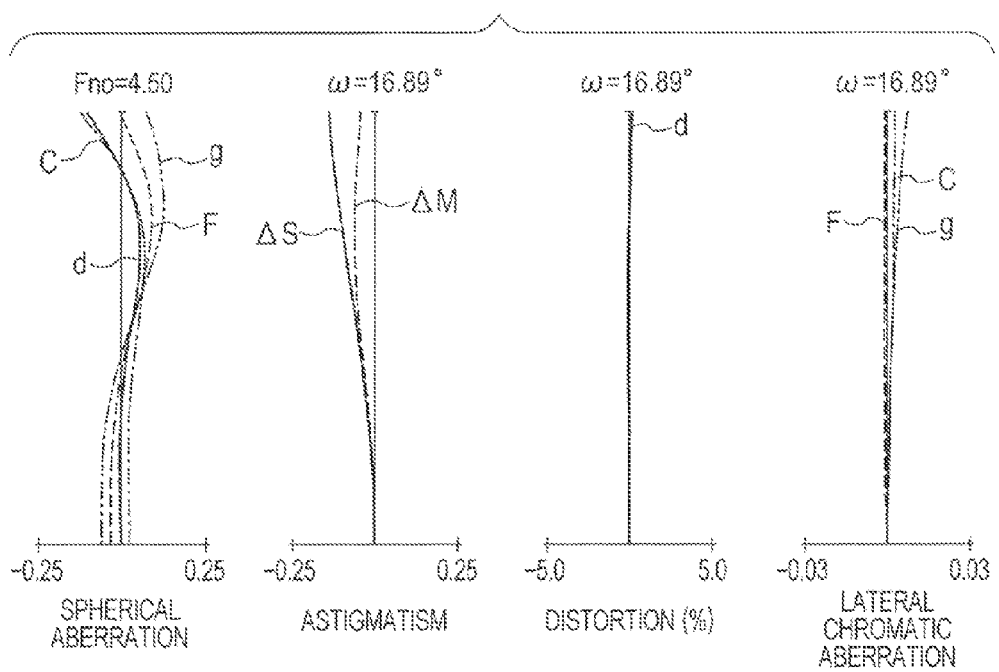

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an imaging optical system such as a digital still camera, a digital video camera, a TV camera, and a monitoring camera.

Description of the Related Art

Hitherto, an imaging optical system used in an image pickup apparatus has been required to have a high optical performance over the entire object distance from infinity to close-up. Moreover, an image pickup apparatus capable of realizing focusing at high speed and with high precision has been required. In particular, when autofocus is performed, a focus speed has been required to be high.

Meanwhile, in recent years, an image pickup apparatus such as a single-lens reflex camera has been required to have a moving picture photographing function and to be able to perform autofocus while shooting a moving picture. As an autofocus method when the moving picture is taken, the contrast AF method (TV-AF method) in which a change in contrast in an imaged signal is detected to evaluate a focus state of the imaging optical system has often been used.

In the TV-AF method, fast small vibration in an optical axis direction is generated in a focus lens unit, and the imaged signal obtained at that time is used. In the TV-AF method, the focus lens unit is required to be small in size and light in weight in order that the focus lens unit may be driven at high speed, and further in order that a load on a drive unit (actuator) for driving the focus lens unit is reduced to maintain silence.

Hitherto, there has been known a zoom lens in which, of a plurality of lens units constituting the zoom lens, a lens unit that is relatively small in size and light in weight is moved for focusing.

In Japanese Patent Application Laid-Open No. 2003-295060, in a zoom lens including first to fourth lens units respectively having positive, negative, positive, and positive refractive powers in order from an object side, the second lens unit, or the first lens unit and the second lens unit is/are moved in an optical axis direction for focusing.

In Japanese Patent Application Laid-Open No. 2009-251114, in a zoom lens including first to fifth lens units respectively having positive, negative, positive, positive, and positive refractive powers in order from an object side to an image side, in which the lens units are moved for zooming, the third lens unit is used for focusing.

In Japanese Patent Application Laid-Open No. 2012-247687, in a zoom lens including first to fourth lens units respectively having negative, positive, negative, and positive refractive powers in order from an object side, the second lens unit is moved in an optical axis direction for focusing.

In order to obtain a zoom lens having the high optical performance over the entire object distance while reducing the size of the entire system, and in addition, being capable of focusing at high speed, it is important to appropriately configure a zoom type, the number of focus lens units and moving conditions thereof, and the like. It is especially important to appropriately set refractive powers of lens units arranged on the object side and the image side of the focus lens unit, a lens configuration of the focus lens unit, and the like.

When the above-mentioned configurations are inappropriate, it becomes difficult to obtain a zoom lens which secures a predetermined zoom ratio and has the high optical performance over the entire object distance from infinity to close-up while reducing the size of the entire system. For example, when a lens unit that mainly plays the role of varying magnification in the zoom lens is used for focusing, a variation in aberration accompanying the focusing is increased, and for the purpose of correcting the variation in aberration, there is a need to increase the number of lenses constituting the lens unit that mainly plays the role of varying magnification. Then, the focus lens unit itself inevitably increases in weight, which makes the focusing at high speed difficult.

Moreover, when a lens unit that is small in size and light in weight is used for focusing, unless a refractive power of the focus lens unit is set appropriately, the variation in aberration is increased during focusing, which makes it difficult to obtain the high optical performance over the entire object distance.

SUMMARY OF THE INVENTION

According to one embodiment of the present invention, there is provided a zoom lens including a plurality of lens units, in which an interval between adjacent lens units changes during zooming. The zoom lens includes: a first lens subunit (Lp1) having a positive refractive power; a second lens subunit (Lp2) having a positive refractive power, which is arranged adjacent to an image side of the first lens subunit (Lp1); and at least one lens unit on an object side of the first lens subunit (Lp1). In the zoom lens, lens systems arranged on the object side of the first lens subunit (Lp1) have a negative combined focal length over an entire zoom range. The second lens subunit (Lp2) moves along an optical axis to the image side during focusing from an object at infinity to a proximate object. The zoom lens satisfies the following conditional expression: $1.0 < fp1/fp2 < 10.0$, where fp1 represents a focal length of the first lens subunit (Lp1), and fp2 represents a focal length of the second lens subunit (Lp2).

Further features of the present invention will become apparent from the following description of exemplary embodiments with reference to the attached drawings.

BRIEF DESCRIPTION OF THE DRAWINGS

FIG. 1 is a lens cross-sectional view at a wide angle end of a zoom lens according to Embodiment 1 of the present invention.

FIG. 8A is a longitudinal aberration diagram at the wide angle end according to Embodiment 3 (object distance: infinity).

FIG. 8B is a longitudinal aberration diagram at a telephoto end according to Embodiment 3 (object distance: infinity).

FIG. 9A is a longitudinal aberration diagram at the wide angle end according to Embodiment 3 (object distance: close distance).

FIG. 9B is a longitudinal aberration diagram at the telephoto end according to Embodiment 3 (object distance: close distance).

FIG. 11A is a longitudinal aberration diagram at the wide angle end according to Embodiment 4 (object distance: infinity).

FIG. 11B is a longitudinal aberration diagram at a telephoto end according to Embodiment 4 (object distance: infinity).

FIG. 14A is a longitudinal aberration diagram at the wide angle end according to Embodiment 5 (object distance: infinity).

FIG. 14B is a longitudinal aberration diagram at a telephoto end according to Embodiment 5 (object distance: infinity).

DESCRIPTION OF THE EMBODIMENTS

Preferred Embodiments of the present invention will now be described in detail in accordance with the accompanying drawings.

Now, a zoom lens and an image pickup apparatus including the same according to the present invention are described. According to the present invention, there is provided a zoom lens including a plurality of lens units, in which an interval between adjacent lens units changes. The zoom lens includes: a first lens subunit Lp1 having a positive refractive power; a second lens subunit Lp2 having a positive refractive power, which is arranged adjacent to an image side of the first lens subunit Lp1; and at least one lens unit on an object side of the first lens subunit Lp1. A third lens subunit Lp3 having a positive refractive power may be arranged adjacent to the image side of the second lens subunit Lp2.

Lens systems arranged on the object side of the first lens subunit Lp1 have a negative combined focal length over an entire zoom range, and the second lens subunit Lp2 moves along an optical axis to the image side during focusing from an object at infinity to a proximate object.

Note that, the lens units in the zoom lens according to the present invention are separated based on a criterion that the interval on the optical axis changes during the zooming, and include not only a case of including a plurality of lenses but also a case of including a single lens. Moreover, the lens subunits in the zoom lens according to the present invention are separated based on a criterion that the interval on the optical axis changes during the focusing, and include not only a case of including a plurality of lenses but also a case of including a single lens.

Moreover, in a case where a part of a lens unit moves during the focusing, the part that moves during the focusing and a part that does not move during the focusing respectively correspond to lens subunits. In a case where the entire lens unit moves during the focusing, the entire lens unit corresponds to a lens subunit.

Figure 2A:
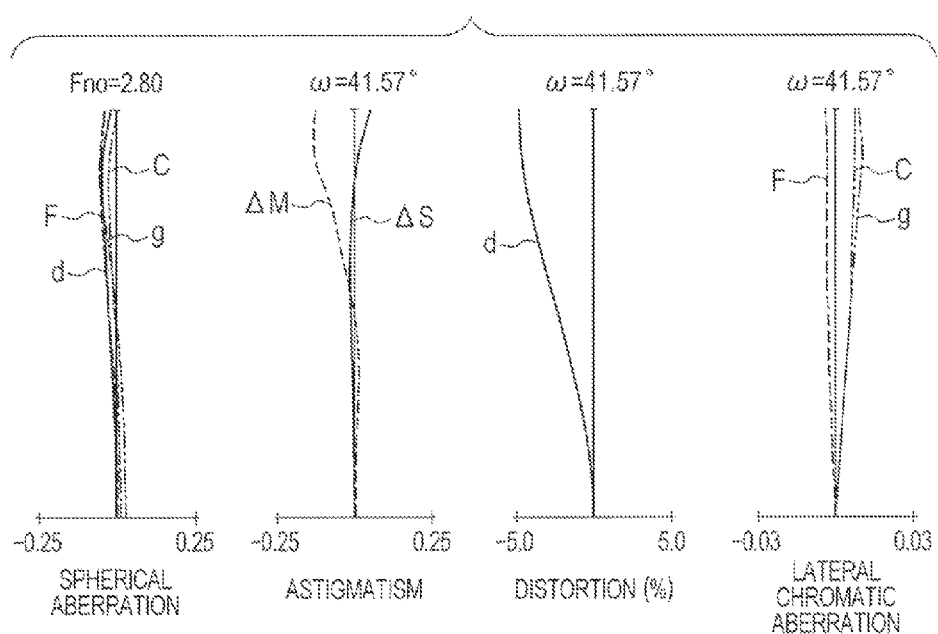
FIG. 2A is a longitudinal aberration diagram at the wide angle end according to Embodiment 1 (object distance: infinity).
Figure 2B:
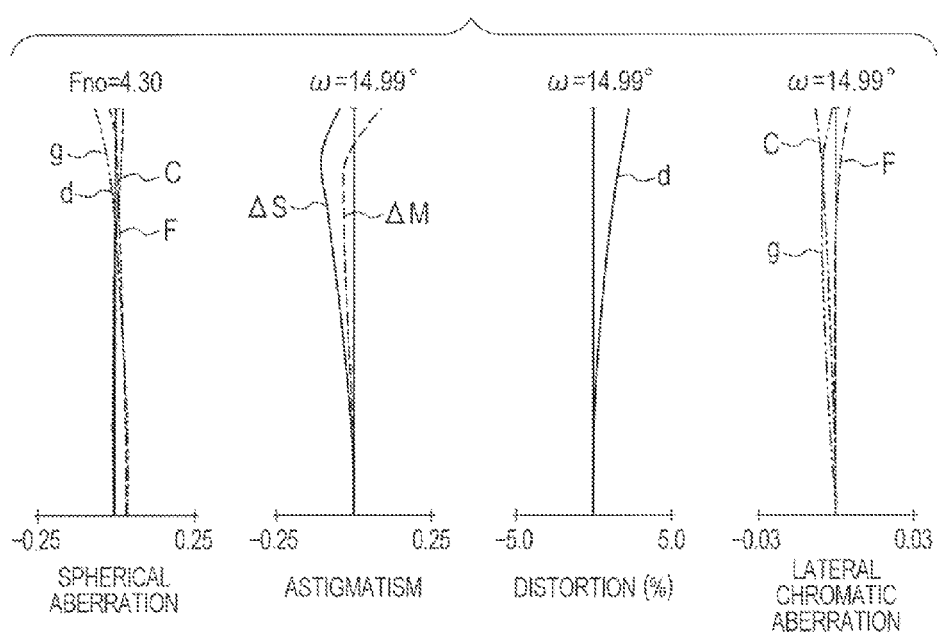
FIG. 2B is a longitudinal aberration diagram at a telephoto end according to Embodiment 1 (object distance: infinity).
Figure 3A:
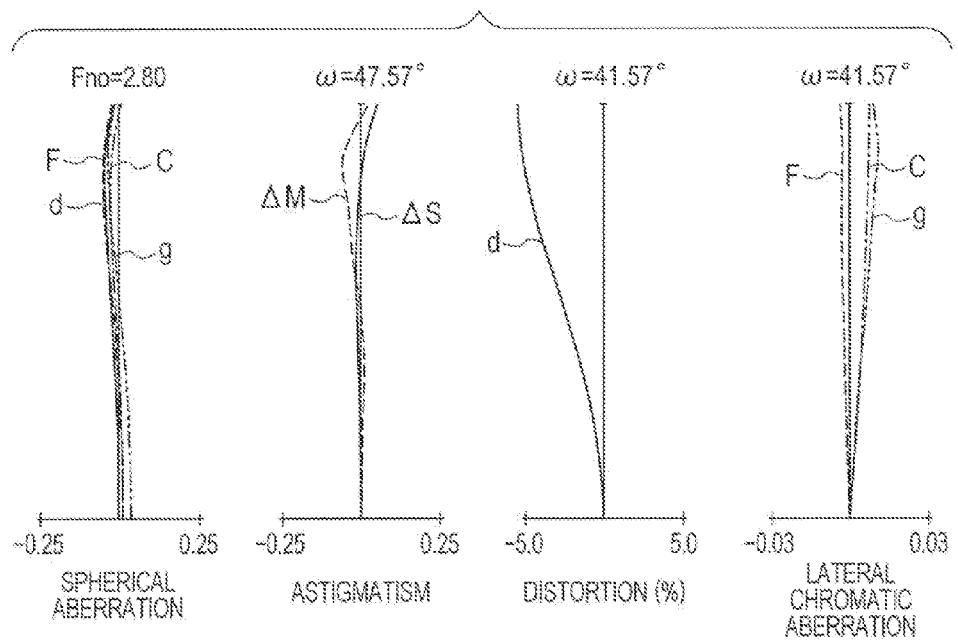
FIG. 3A is a longitudinal aberration diagram at the wide angle end according to Embodiment 1 (object distance: close distance).
Figure 3B:
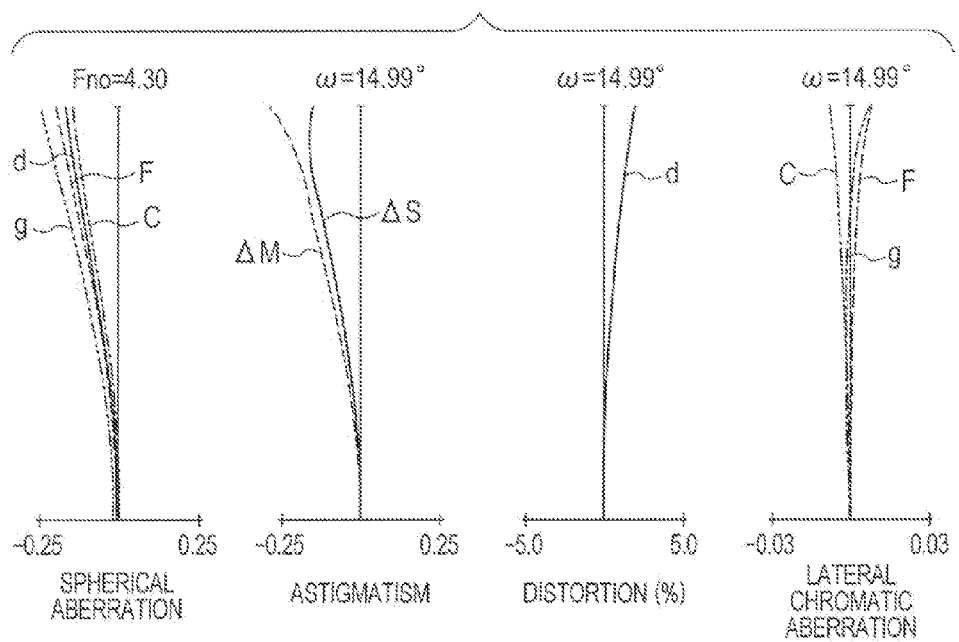
FIG. 3B is a longitudinal aberration diagram at the telephoto end according to Embodiment 1 (object distance: close distance).

FIG. 1 is a lens cross-sectional view at a wide angle end (short focal length end) of a zoom lens according to Embodiment 1 of the present invention. FIGS. 2A and 2B are longitudinal aberration diagrams at the wide angle end and a telephoto end (long focal length end) when in focus at infinity according to Embodiment 1 of the present invention, respectively. FIGS. 3A and 3B are longitudinal aberration diagrams at the wide angle end and the telephoto end when in focus at an object at an object distance of 1.0 m (close distance) according to Embodiment 1 of the present invention, respectively. Note that, the object distance is a distance from an image plane when numerical embodiments to be described later are expressed in units of mm. The same applies hereinbelow. Embodiment 1 relates to a zoom lens having a zoom ratio of 3.31 and an F number of 2.80 to 4.30.

Figure 4:
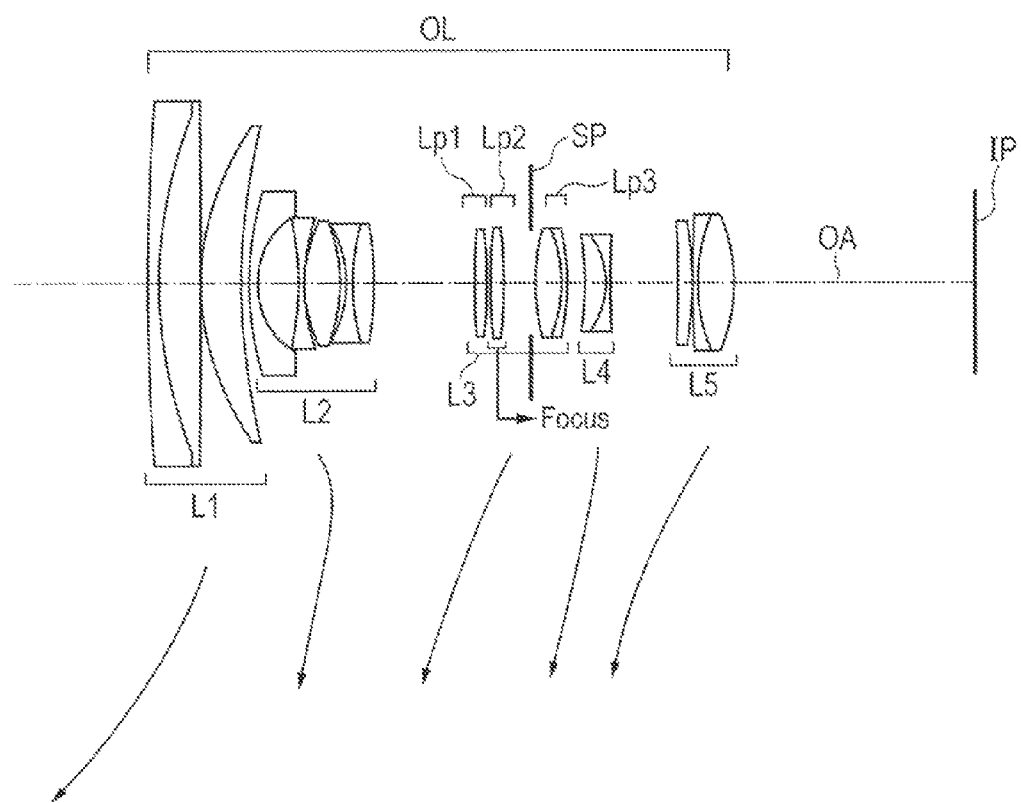
FIG. 4 is a lens cross-sectional view at a wide angle end of a zoom lens according to Embodiment 2 of the present invention.
Figure 5A:
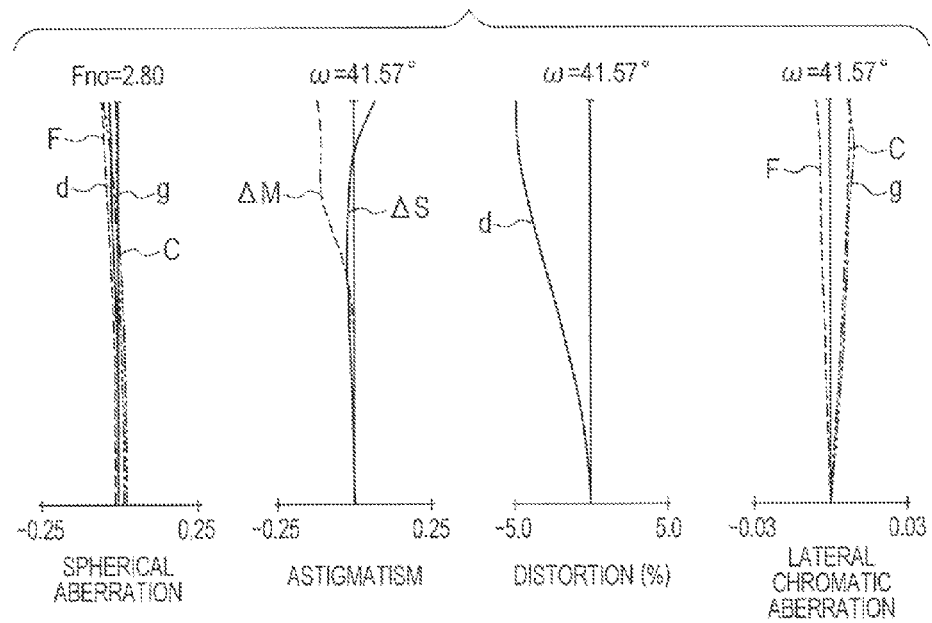
FIG. 5A is a longitudinal aberration diagram at the wide angle end according to Embodiment 2 (object distance: infinity).
Figure 5B:
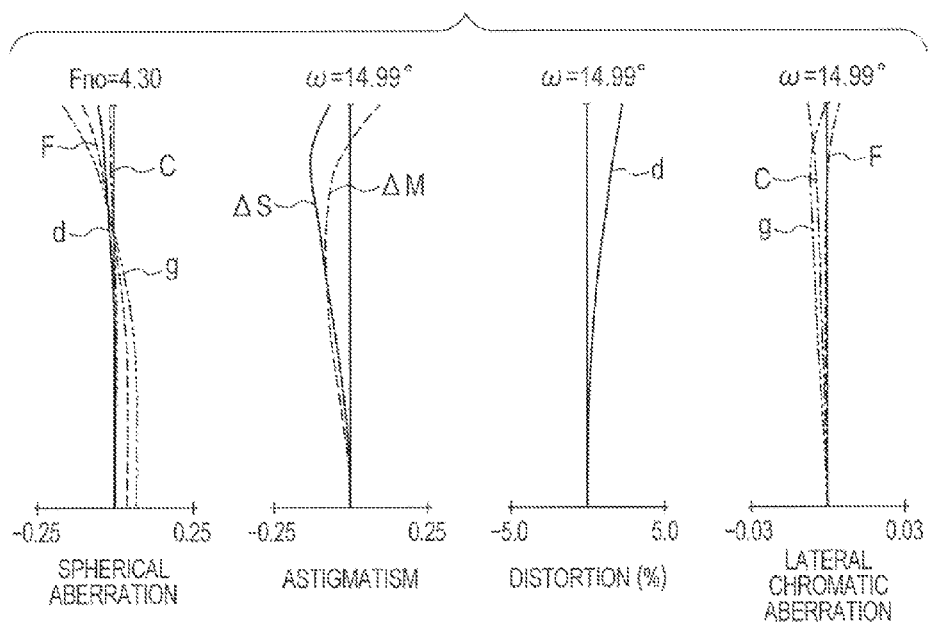
FIG. 5B is a longitudinal aberration diagram at a telephoto end according to Embodiment 2 (object distance: infinity).
Figure 6A:
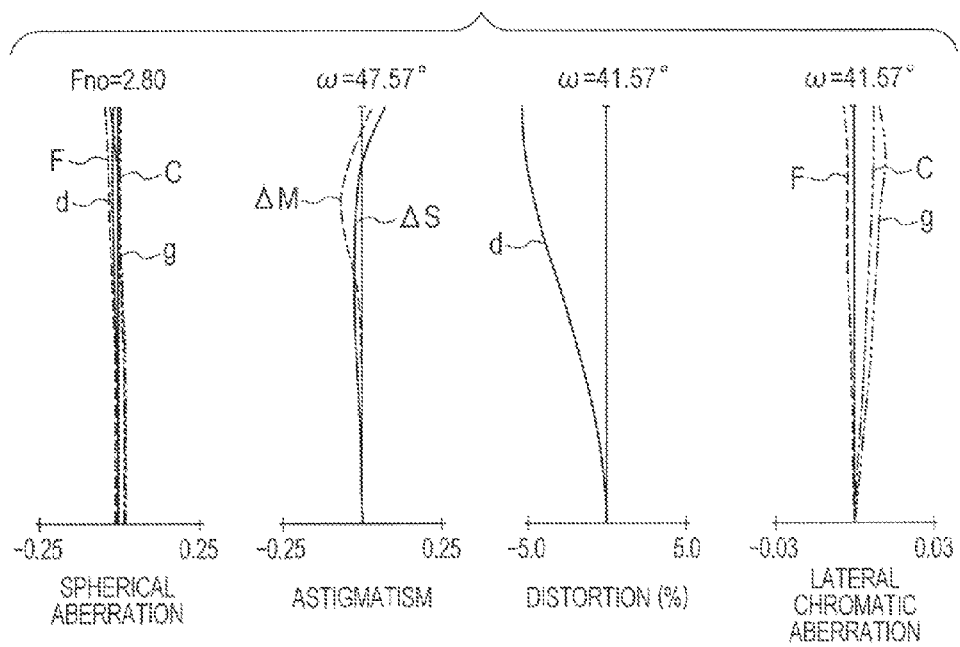
FIG. 6A is a longitudinal aberration diagram at the wide angle end according to Embodiment 2 (object distance: close distance).
Figure 6B:
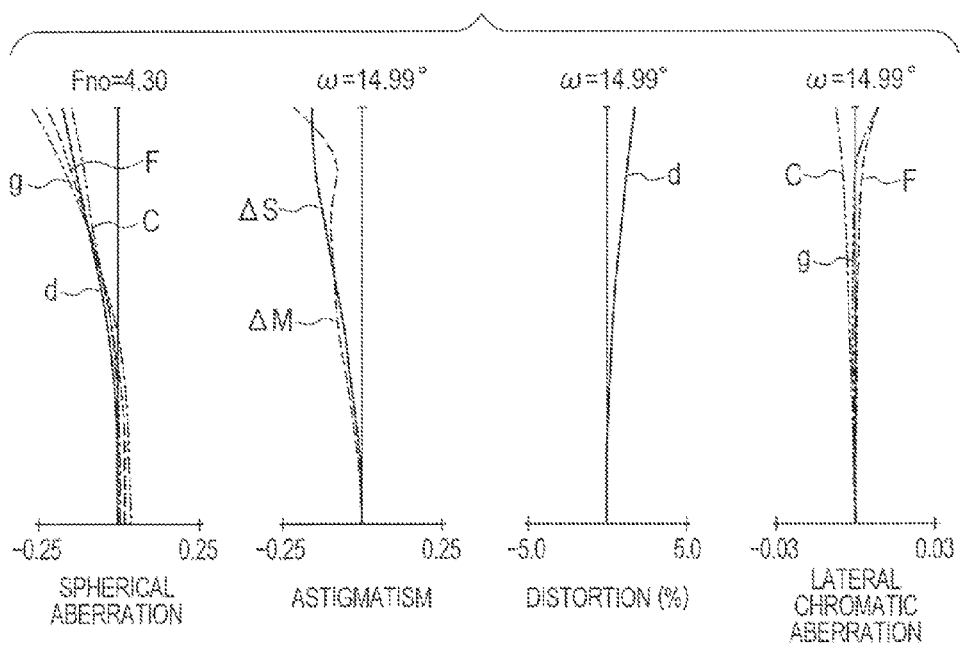
FIG. 6B is a longitudinal aberration diagram at the telephoto end according to Embodiment 2 (object distance: close distance).

FIG. 4 is a lens cross-sectional view at a wide angle end of a zoom lens according to Embodiment 2 of the present invention. FIGS. 5A and 5B are longitudinal aberration diagrams at the wide angle end and a telephoto end when in focus at infinity according to Embodiment 2 of the present invention, respectively. FIGS. 6A and 6B are longitudinal aberration diagrams at the wide angle end and the telephoto end when in focus at an object at an object distance of 1.0 m (close distance) according to Embodiment 2 of the present invention, respectively. Embodiment 2 relates to a zoom lens having a zoom ratio of 3.31 and an F number of 2.80 to 4.11.

Figure 7:
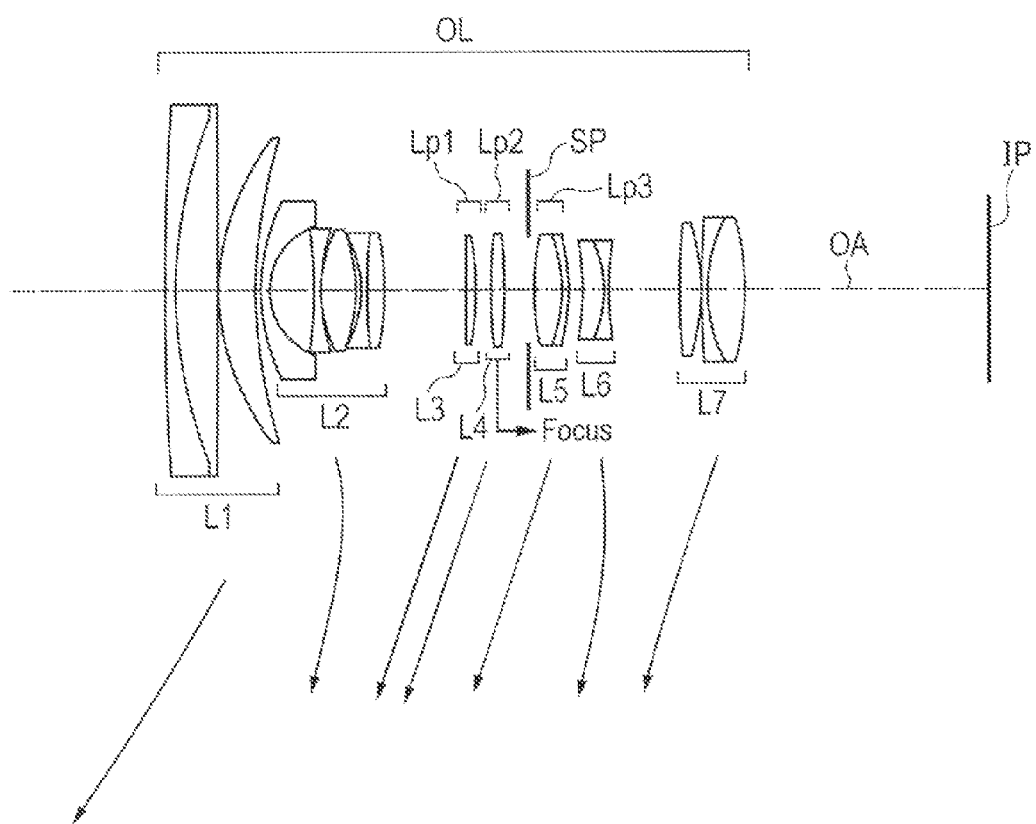
FIG. 7 is a lens cross-sectional view at a wide angle end of a zoom lens according to Embodiment 3 of the present invention.

FIG. 7 is a lens cross-sectional view at a wide angle end of a zoom lens according to Embodiment 3 of the present invention. FIGS. 8A and 8B are longitudinal aberration diagrams at the wide angle end and a telephoto end when in focus at infinity according to Embodiment 3 of the present invention, respectively. FIGS. 9A and 9B are longitudinal aberration diagrams at the wide angle end and the telephoto end when in focus at an object at an object distance of 1.0 m (close distance) according to Embodiment 3 of the present invention, respectively. Embodiment 3 relates to a zoom lens having a zoom ratio of 3.31 and an F number of 2.80 to 4.30.

Figure 10:
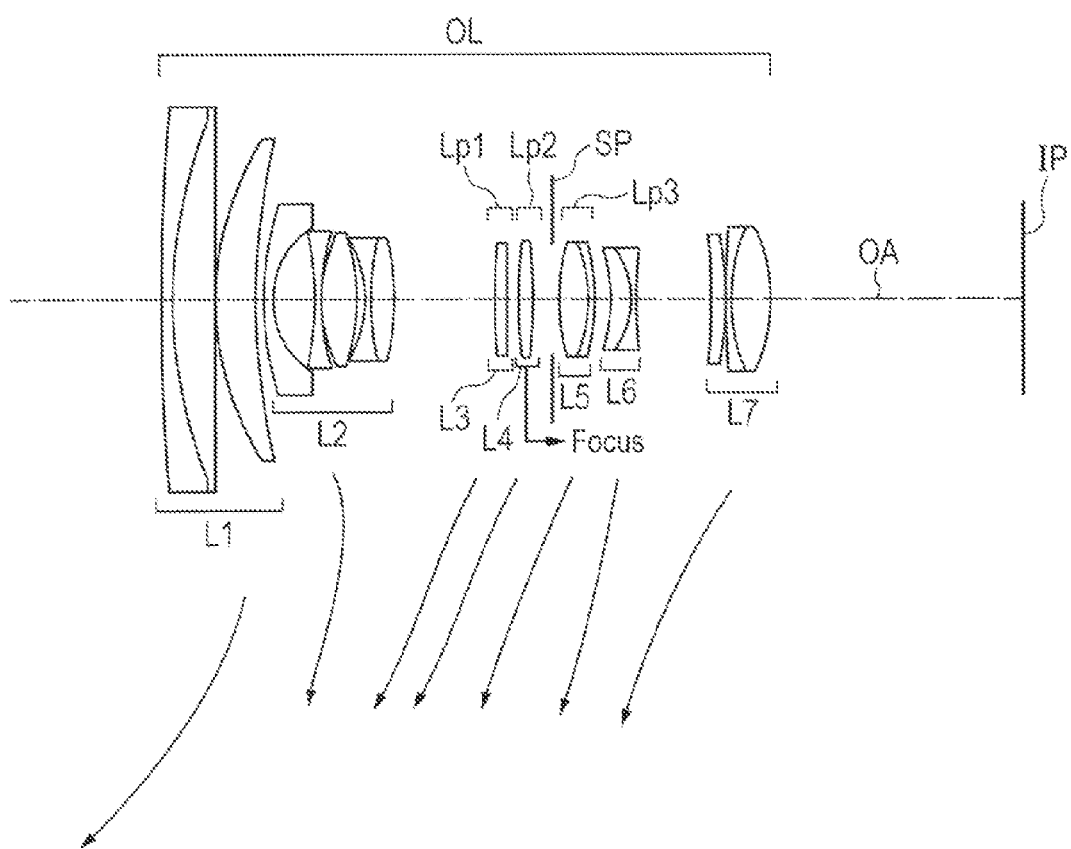
FIG. 10 is a lens cross-sectional view at a wide angle end of a zoom lens according to Embodiment 4 of the present invention.
Figure 12A:
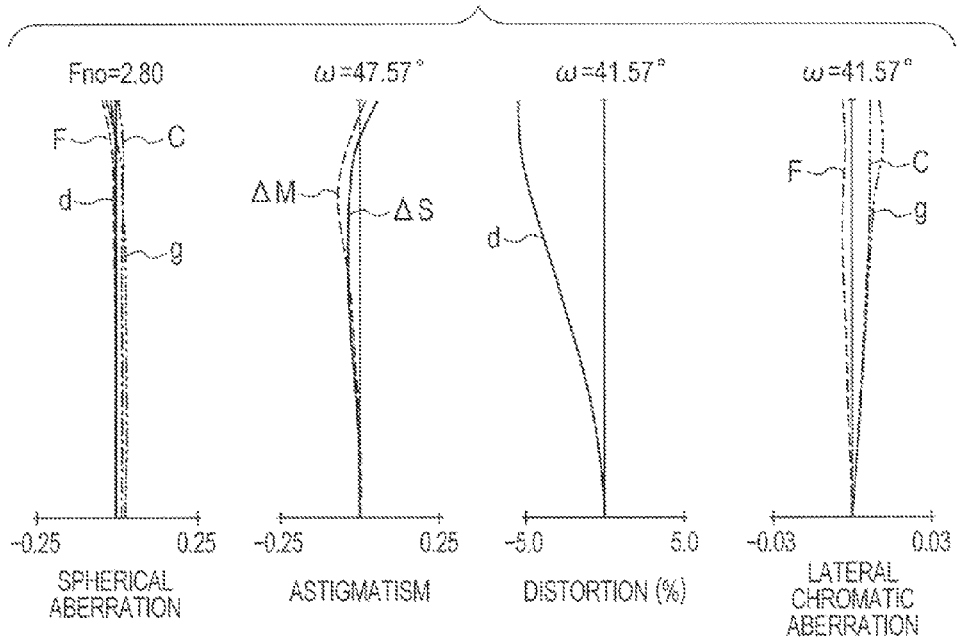
FIG. 12A is a longitudinal aberration diagram at the wide angle end according to Embodiment 4 (object distance: close distance).
Figure 12B:
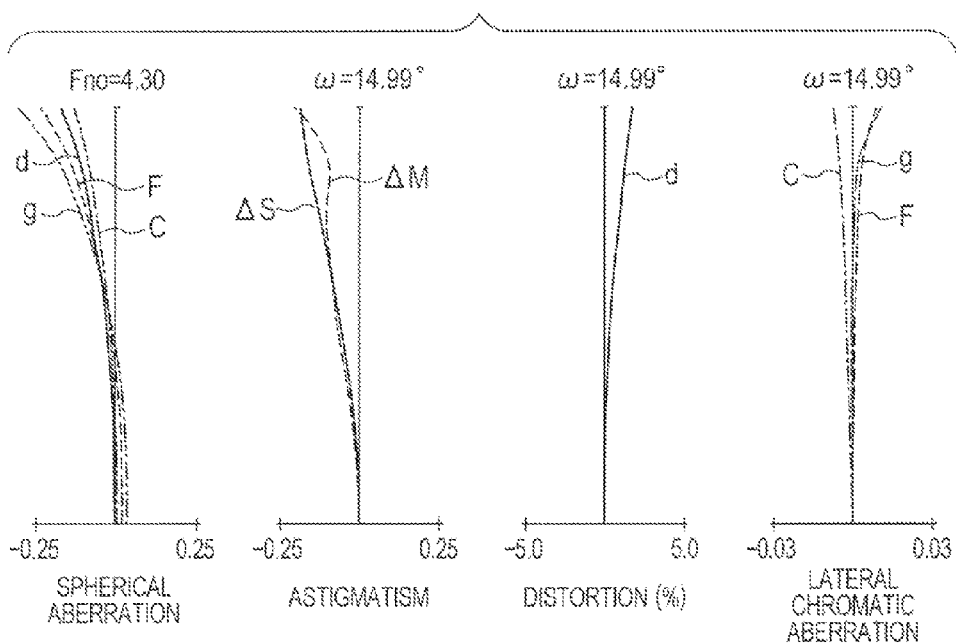
FIG. 12B is a longitudinal aberration diagram at the telephoto end according to Embodiment 4 (object distance: close distance).

FIG. 10 is a lens cross-sectional view at a wide angle end of a zoom lens according to Embodiment 4 of the present invention. FIGS. 11A and 11B are longitudinal aberration diagrams at the wide angle end and a telephoto end when in focus at infinity according to Embodiment 4 of the present invention, respectively. FIGS. 12A and 12B are longitudinal aberration diagrams at the wide angle end and the telephoto end when in focus at an object at an object distance of 1.0 m (close distance) according to Embodiment 4 of the present invention, respectively. Embodiment 4 relates to a zoom lens having a zoom ratio of 3.31 and an F number of 2.80 to 4.14.

Figure 13:
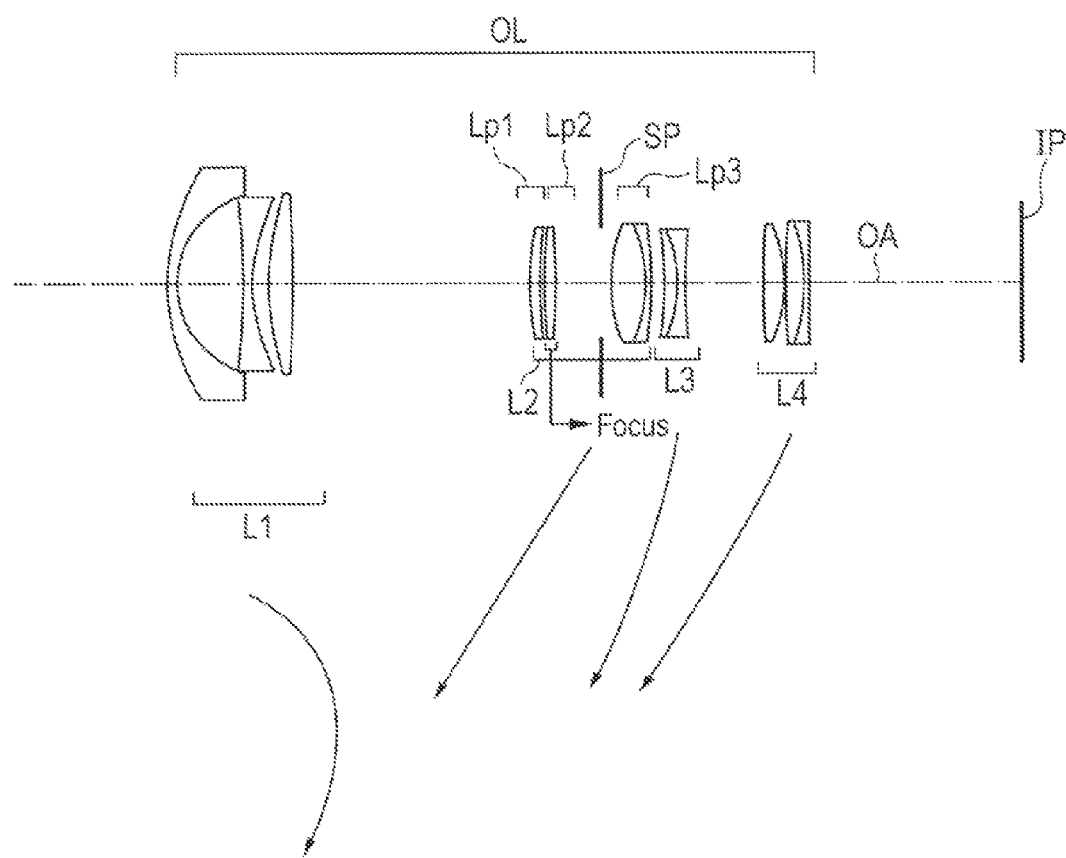
FIG. 13 is a lens cross-sectional view at a wide angle end of a zoom lens according to Embodiment 5 of the present invention.
Figure 15A:
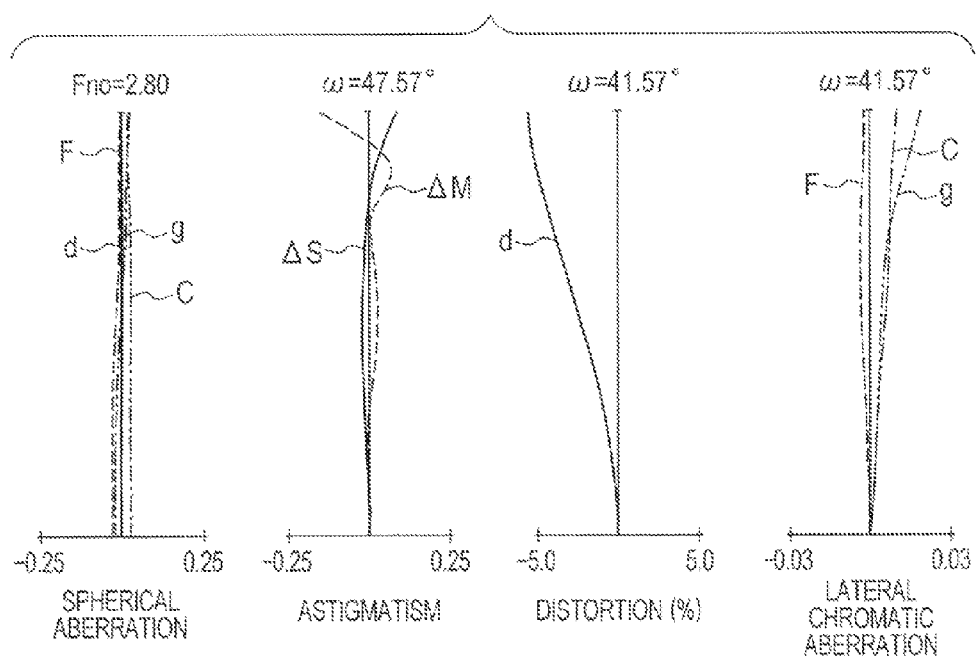
FIG. 15A is a longitudinal aberration diagram at the wide angle end according to Embodiment 5 (object distance: close distance).
Figure 15B:
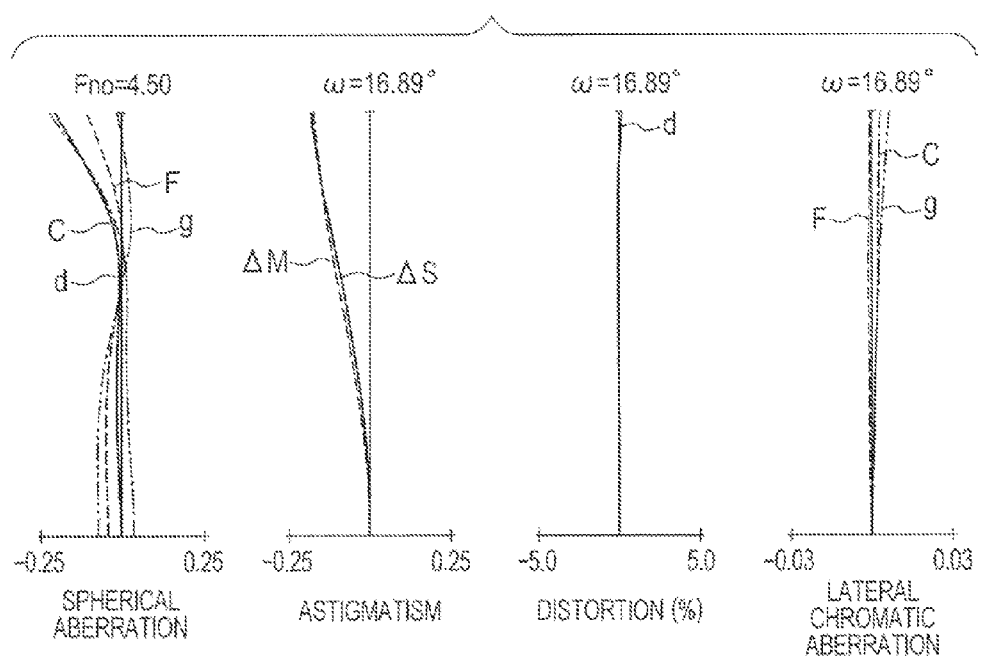
FIG. 15B is a longitudinal aberration diagram at the telephoto end according to Embodiment 5 (object distance: close distance).

FIG. 13 is a lens cross-sectional view at a wide angle end of a zoom lens according to Embodiment 5 of the present invention. FIGS. 14A and 14B are longitudinal aberration diagrams at the wide angle end and a telephoto end when in focus at infinity according to Embodiment 5 of the present invention, respectively. FIGS. 15A and 15B are longitudinal aberration diagrams at the wide angle end and the telephoto end when in focus at an object at an object distance of 1.0 m (close distance) according to Embodiment 5 of the present invention, respectively. Embodiment 5 relates to a zoom lens having a zoom ratio of 2.92 and an F number of 2.80 to 4.50.

Figure 16:
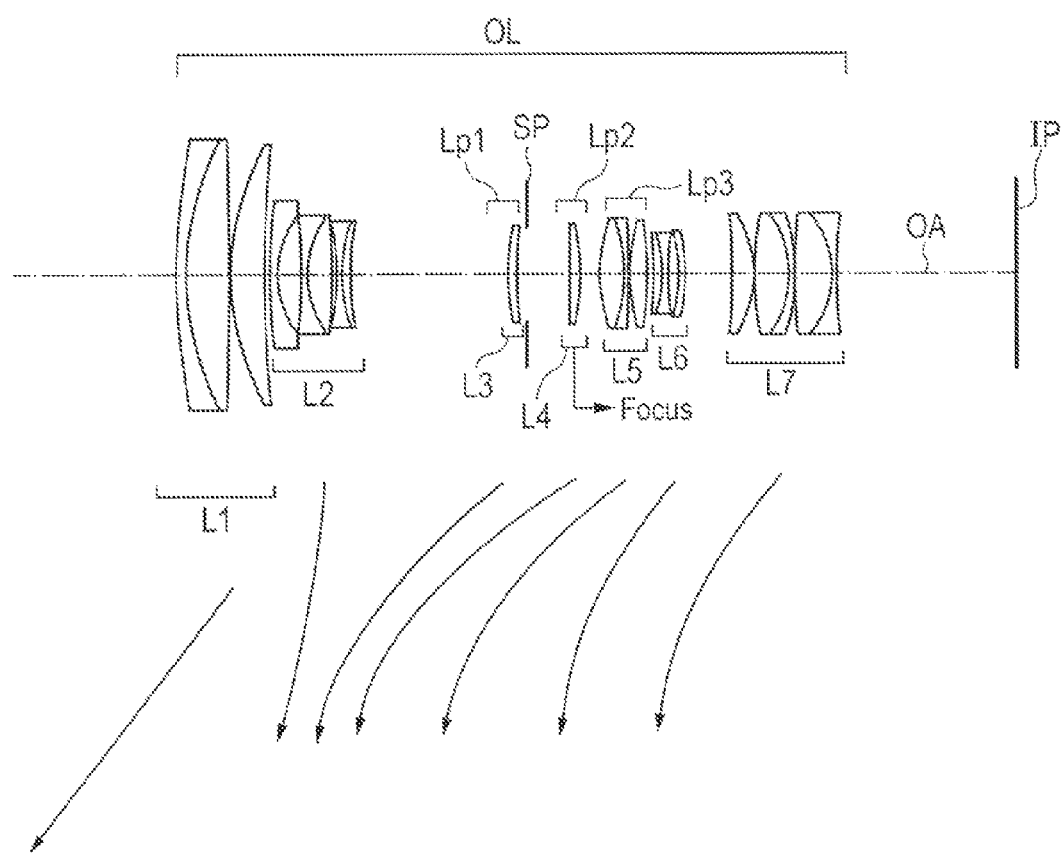
FIG. 16 is a lens cross-sectional view at a wide angle end of a zoom lens according to Embodiment 6 of the present invention.
Figure 17A:
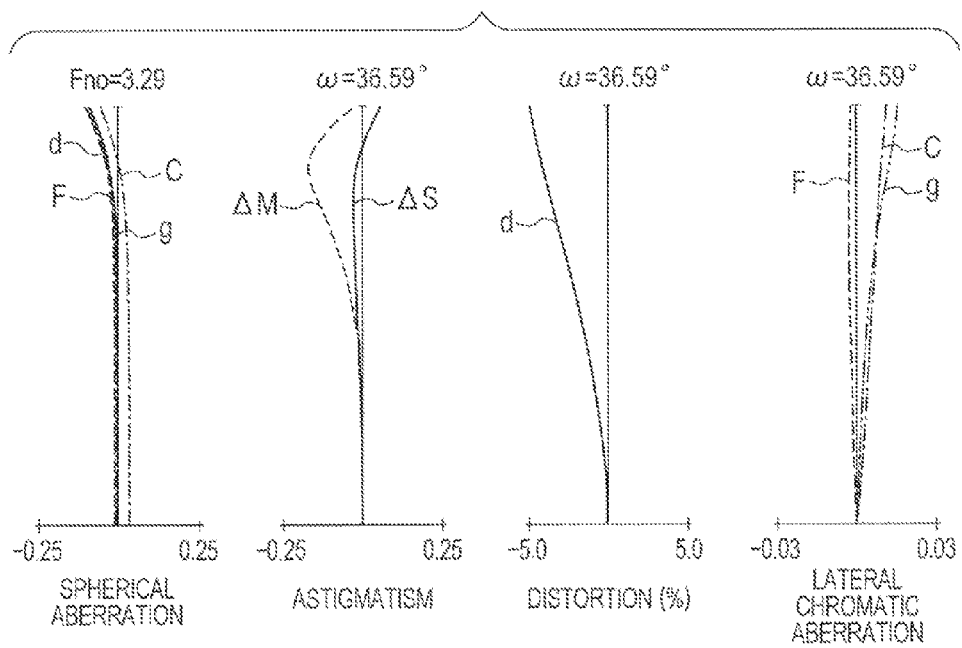
FIG. 17A is a longitudinal aberration diagram at the wide angle end according to Embodiment 6 (object distance: infinity).
Figure 17B:
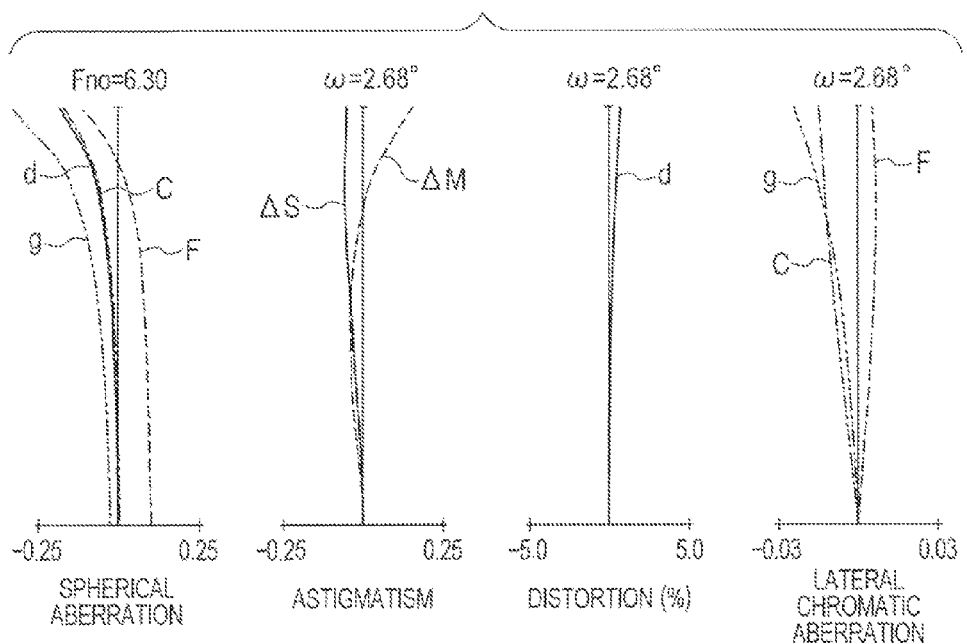
FIG. 17B is a longitudinal aberration diagram at a telephoto end according to Embodiment 6 (object distance: infinity).
Figure 18A:
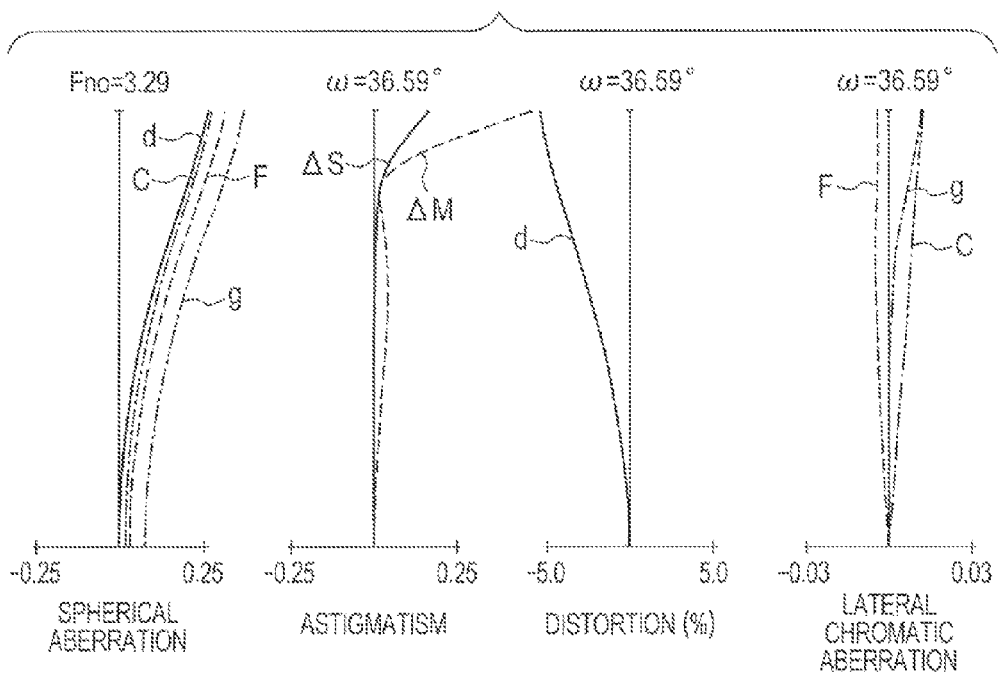
FIG. 18A is a longitudinal aberration diagram at the wide angle end according to Embodiment 6 (object distance: close distance).
Figure 18B:
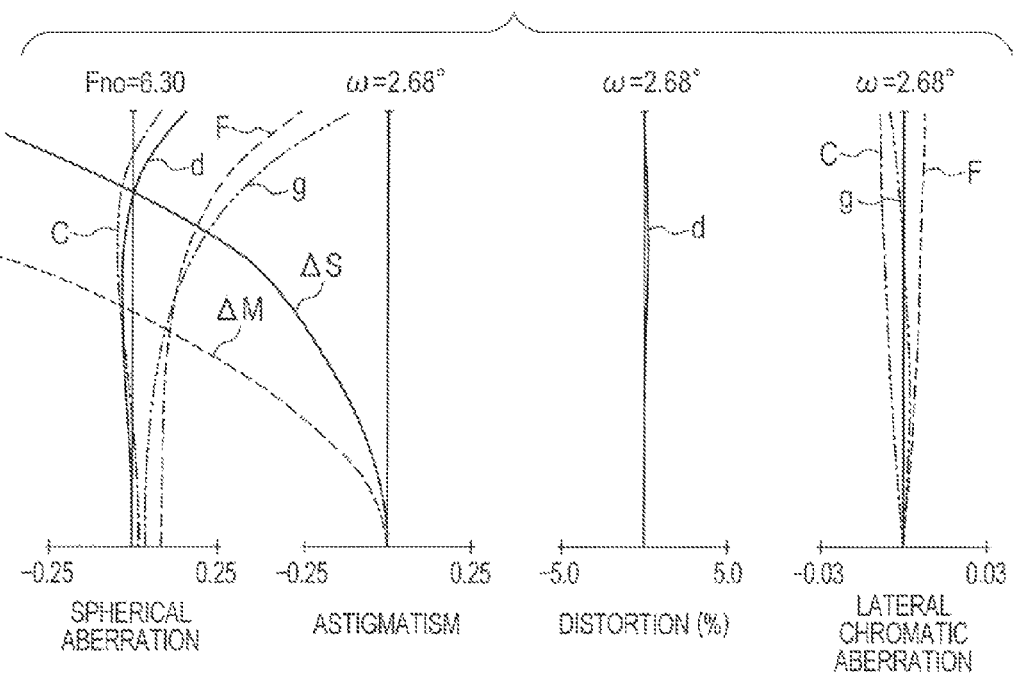
FIG. 18B is a longitudinal aberration diagram at the telephoto end according to Embodiment 6 (object distance: close distance).
Figure 19:
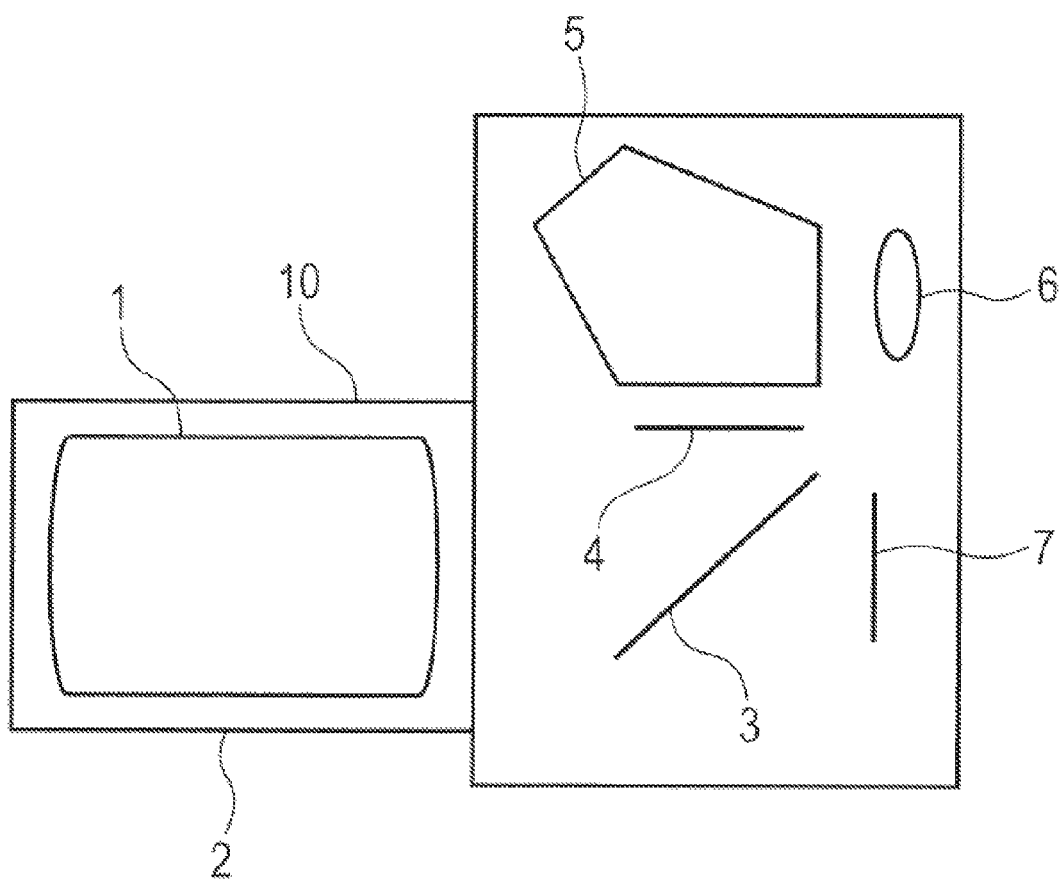
FIG. 19 is a schematic diagram of a main part of an image pickup apparatus according to the present invention.

FIG. 16 is a lens cross-sectional view at a wide angle end of a zoom lens according to Embodiment 6 of the present invention. FIGS. 17A and 17B are longitudinal aberration diagrams at the wide angle end and a telephoto end when in focus at infinity according to Embodiment 6 of the present invention, respectively. FIGS. 18A and 18B are longitudinal aberration diagrams at the wide angle end and the telephoto end when in focus at an object at an object distance of 1.0 m (close distance) according to Embodiment 6 of the present invention, respectively. Embodiment 6 relates to a zoom lens having a zoom ratio of 15.87 and an F number of 3.29 to 6.30. FIG. 19 is a schematic diagram of a main part of an image pickup apparatus having the zoom lens according to the present invention.

The zoom lens of each of the embodiments is a photographing lens system used for an image pickup apparatus such as a digital still camera or a silver-halide film camera. On each of the lens cross-sectional views, the left is an object side (front side), whereas the right is an image side (rear side). When the zoom lens of each of the embodiments is used for a projecting lens such as a projector, the left is a screen side, whereas the right is a projected image side. In the lens cross-sectional views, symbol OL represents a zoom lens, symbol i represents the order of the lens units from the object side, and symbol Li represents an i-th lens unit.

The first lens subunit Lp1 having the positive refractive power is denoted by Lp1. The second lens subunit Lp2 having the positive refractive power, which moves during the focusing, is denoted by Lp2. The third lens subunit Lp3 having the positive refractive power is denoted by Lp3.

The zoom lens includes an aperture stop SP (F-number determining stop). An image plane IP corresponds to an image pickup surface of a solid-state image pickup element (photoelectric transducer) such as a CCD sensor or a CMOS sensor when the zoom lens is used as an imaging optical system of a video camera or a digital still camera, and corresponds to a film surface when the zoom lens is used as an imaging optical system of a silver-halide film camera. An arrow indicates a movement locus of each of the lens units during zooming from the wide angle end to the telephoto end. Arrows concerning focus indicates movement directions of each of the lens units in focusing from infinity to close-up.

In the spherical aberration diagram, the solid line indicates a d-line (having a wavelength of 587.6 nm), the chain double-dashed line indicates a g-line (having a wavelength of 435.8 nm), the chain line indicates a C-line (having a wavelength of 656.3 nm), and the broken line indicates an F-line (having a wavelength of 486.1 nm). In the astigmatism diagram, the dotted line ($\Delta M$) indicates a meridional image plane and the solid line ($\Delta S$) indicates a sagittal image plane. In addition, a distortion is indicated for the d-line. A lateral chromatic aberration is indicated by the g-line, the F-line, and the C-line. Symbol ω represents a half angle of field (degree), and symbol Fno represents an F number. Note that, in Embodiments described below, the wide angle end and the telephoto end respectively refer to zoom positions when a magnification-varying lens unit is located at both ends of a mechanically movable range on an optical axis.

The zoom lens in each of Embodiments includes a plurality of lens units that move during the zooming. The zoom lens also includes the first lens subunit Lp1 having the positive refractive power, and the second lens subunit Lp2 having the positive refractive power. The first lens subunit Lp1 and the second lens subunit Lp2 are arranged adjacent to each other in order from the object side to the image side. The lens systems arranged on the object side of the first lens subunit Lp1 have the negative combined focal length over the entire zoom range. Moreover, the second lens subunit Lp2 moves along the optical axis to the image side during the focusing from the object at infinity to the object at the close distance. Further, a focal length of the first lens subunit Lp1 is represented by fp1, and a focal length of the second lens subunit Lp2 is represented by fp2.

Then, the following conditional expression is satisfied:

$$1.0 < fp1/fp2 < 10.0 \quad (1)$$

First, differences in lens configuration between the zoom lens in each of Embodiments and the zoom lens described in Japanese Patent Application Laid-Open No. 2009-251114 and Japanese Patent Application Laid-Open No. 2012-247687 are described.

In the zoom lens system described in Japanese Patent Application Laid-Open No. 2009-251114, the third lens unit having the positive refractive power is used for the focusing, and lens systems on the object side thereof have a negative combined focal length over the entire zoom range. In this zoom lens system, the third lens unit exerts an action of converging a ray diverged by negative refractive powers of the lens systems on the object side.

Therefore, the third lens unit has a relatively strong positive refractive power, and when the third lens unit is moved during the focusing, a variation in aberration is increased. Moreover, in the photographic lens described in Japanese Patent Application Laid-Open No. 2012-247687, the second lens unit having the positive refractive power is used for the focusing, and lens systems on the object side thereof also have a negative combined focal length over the entire zoom range. In this photographic lens also, the second lens unit exerts the action of converging the ray diverged by the negative refractive powers of the lens systems on the object side, and has a relatively strong positive refractive power. Therefore, when this second lens unit is moved during the focusing, the variation in aberration is increased.

In contrast, in the zoom lens in each of Embodiments, on the object side of the second lens subunit Lp2 for the focusing, the first lens subunit Lp1 having the positive refractive power is further arranged. Such refractive power arrangement is adopted to reduce the positive refractive power of the second lens subunit Lp2 for the focusing, and hence reduce the variation in aberration during the focusing. Further, a divergent ray generated by the lens systems on the object side is made approximately close to parallel by the first lens subunit Lp1.

Next, the above-mentioned effect is described with the use of axial rays. When an axial ray incident on a lens unit for the focusing becomes approximately close to parallel, even with the lens unit for the focusing moving in the optical axis direction, a change in incident height of the ray that passes through the lens unit for the focusing is reduced. An amount of aberration generated in an optical system strongly depends on the incident height of the ray from the optical axis, and the reduced change in incident height translates into the reduced variation in aberration. Therefore, when the change in incident height of the ray incident on the lens unit for the focusing is reduced, it is possible to reduce the variation in aberration during the focusing.

In other words, in the zoom lens in each of Embodiments, the action of converging the divergent ray that exits from the object side is shared by the first lens subunit Lp1, and the second lens subunit Lp2 and the subsequent units thereof. In this manner, the variation in aberration during the focusing is reduced without making the refractive power of the second lens subunit Lp2 for the focusing too strong. Moreover, the divergent ray is made approximately close to parallel by the first lens subunit Lp1 to further reduce the variation in aberration during the focusing.

In the zoom lens of the present invention, the above-mentioned refractive power arrangement is adopted to correct various aberrations, in particular, a variation in spherical aberration during the focusing satisfactorily.

Next, technical meanings of the conditional expression (1) described above is described. The conditional expression (1) is to restrict a ratio of the focal lengths of the first lens subunit Lp1 and the second lens subunit Lp2. Below the lower limit of the conditional expression (1), the refractive power of the second lens subunit Lp2 is reduced relatively. Then, an amount of movement of the second lens subunit Lp2 during the focusing is increased, which requires a space for the movement to be secured, and hence the zoom lens is increased in size. On the other hand, above the upper limit of the conditional expression (1), the refractive power of the first lens subunit Lp1 is reduced relatively.

Then, with the both actions of the increased refractive power of the second lens subunit Lp2 as described above and the reduced action of converging the ray in the first lens subunit Lp1, the variation in aberration during the focusing is disadvantageously increased. As described above, the conditional expression (1) reduces the variation in aberration during the focusing while maintaining the size of the zoom lens small.

It is more preferred to set the numerical range of the conditional expression (1) as follows:

$$1.2 < fp1/fp2 < 6.0 \quad (1a)$$

It is further preferred to set the numerical range of the conditional expression (1a) as follows:

$$1.5 < fp1/fp2 < 5.0 \quad (1b)$$

As described above, according to each of Embodiments, it is possible to obtain the zoom lens that is easy to focus at high speed, and in addition, has the small variation in aberration during the focusing so as to attain high performance over the entire object distance in spite of the small size of the entire system.

Moreover, in the zoom lens in each of Embodiments, the lens systems on the object side of the second lens subunit Lp2 for the focusing have a negative combined focal length over the entire zoom range. With the lens systems on the object side of the second lens subunit Lp2 having the negative combined focal length over the entire zoom range, a lateral magnification of the second lens subunit Lp2 itself may be set relatively large, which advantageously makes it easy to increase focus sensitivity accordingly.

Moreover, in the zoom lens in each of Embodiments, it is preferred that the second lens subunit Lp2 for the focusing include two or less lenses. This configuration makes it easy to reduce the weight of the second lens subunit Lp2 itself, and hence makes it easy to focus at high speed. It is more preferred that the second lens subunit Lp2 include one positive lens with a convex surface thereof facing the image plane side. This configuration makes it easy to further reduce the weight, and as a result, makes it easy to focus at high speed.

In each of Embodiments, it is further preferred to satisfy at least one of the following conditional expressions.

$$1.05 < |\beta Lp1t| \quad (2)$$

$$1.10 < |\beta Lp1w| \quad (3)$$

$$2.0 < fp1/fw < 30.0 \quad (4)$$

$$1.0 < fp2/fw < 15.0 \quad (5)$$

$$-4.0 < ff1/fw < -0.5 \quad (6)$$

$$-6.0 < ff2/fw < -0.5 \quad (7)$$

where αLp1t represents a lateral magnification of the first lens subunit Lp1 at the telephoto end, αLp1w represents a lateral magnification of the first lens subunit Lp1 at the wide angle end, fw represents a focal length of the entire system at the wide angle end, ff1 represents a combined focal length of the lens systems arranged on the object side of the first lens subunit Lp1 at the wide angle end, and ff2 represents a combined focal length of the lens systems arranged on the object side of the second lens subunit Lp2 at the wide angle end.

Next, the technical meanings of the conditional expressions (2) to (7) are described.

The conditional expression (2) is set in order to increase the lateral magnification β of the first lens subunit Lp1 at the telephoto end to make an axial ray that exits from the first lens subunit Lp1 approximately close to parallel. When the axial ray that exits from the first lens subunit Lp1 becomes approximately close to parallel, the incident height of the ray that passes through the second lens subunit Lp2 for the focusing becomes hard to change as described above, and it is possible to reduce the variation in spherical aberration during the focusing. Below the lower limit of the conditional expression (2), the above-mentioned effect is reduced, and the variation in spherical aberration during the focusing is disadvantageously increased. Therefore, it is not preferred.

As described above, the conditional expression (2) is satisfied to reduce the variation in spherical aberration at the telephoto end during the focusing.

It is more preferred to set the numerical range of the conditional expression (2) as follows:

$$1.05<|\beta Lp1t|<4.00 \quad (2a)$$

It is further preferred to set the numerical range of the conditional expression (2a) as follows:

$$1.10<|\beta Lp1t|<2.00 \quad (2b)$$

The conditional expression (3) is set in order to reduce the variation in spherical aberration during the focusing on the wide angle end side as with the conditional expression (2). Below the lower limit of the conditional expression (3), the above-mentioned effect is reduced, and the variation in spherical aberration during the focusing is disadvantageously increased. It is more preferred to set the numerical range of the conditional expression (3) as follows:

$$1.10<|\beta Lp1w|<4.00 \quad (3a)$$

It is further preferred to set the numerical range of the conditional expression (3a) as follows:

$$1.15<|\beta Lp1w|<2.00 \quad (3b)$$

The conditional expression (4) relates to the focal length of the first lens subunit Lp1, and the conditional expression (5) relates to the focal length of the second lens subunit Lp2, each of which is standardized with the focal length of the entire system at the wide angle end. Below the lower limit of the conditional expression (4) or above the upper limit of the conditional expression (5), the refractive power of the first lens subunit Lp1 is increased and the refractive power of the second lens subunit Lp2 is reduced relatively. Then, the amount of movement of the second lens subunit Lp2 during the focusing is increased, and the entire zoom lens system is disadvantageously increased in size in order to secure the space for the movement.

Above the upper limit of the conditional expression (4) or below the lower limit of the conditional expression (5), the refractive power of the first lens subunit Lp1 is reduced and the refractive power of the second lens subunit Lp2 is increased relatively. Then, with the both actions of the increased refractive power of the second lens subunit Lp2 and the reduced action of converging the ray in the first lens subunit Lp1, the variation in aberration during the focusing is disadvantageously increased.

As described above, the conditional expressions (4) and (5) are satisfied to reduce the variation in aberration during the focusing while maintaining the size of the entire zoom lens system small. It is more preferred to set the numerical ranges of the conditional expressions (4) and (5) as follows:

$$3.0<fp1/fw<20.0 \quad (4a)$$

$$1.5<fp2/fw<10.0 \quad (5a)$$

It is further preferred to set the numerical ranges of the conditional expressions (4a) and (5a) as follows:

$$0<fp1/fw<16.0 \quad (4b)$$

$$2.0<fp2/fw<7.0 \quad (5b)$$

Moreover, in the zoom lens in each of Embodiments, it is preferred to arrange the third lens subunit Lp3 having the positive refractive power adjacent to the image side of the second lens subunit Lp2 for the focusing. With such refractive power arrangement, the divergent ray generated in the lens systems on the object side may be converged in a shared manner by the three units having the positive refractive powers: the first lens subunit Lp1, the second lens subunit Lp2, and the third lens subunit Lp3.

As a result, it becomes easy to appropriately set the refractive powers of the first lens subunit Lp1 and the second lens subunit Lp2, and the variation in aberration during the focusing may be reduced while maintaining the size of the entire zoom lens system small. Moreover, decentering sensitivity of each of the first lens subunit Lp1, the second lens subunit Lp2, and the third lens subunit Lp3 may be set relatively low, which is advantageous.

The conditional expression (6) relates to the combined focal length of the lens systems on the object side of the first lens subunit Lp1, and the conditional expression (7) relates to the combined focal length of the lens systems on the object side of the second lens subunit Lp2, each of which is standardized with the focal length of the entire system at the wide angle end.

Below the lower limit of the conditional expression (6) or (7), where the negative refractive powers of the lens systems on the object side are reduced (absolute values of the negative refractive powers are decreased), the entire zoom lens system tends to be disadvantageously increased in size. Above the upper limit of the conditional expression (6) or (7), where the negative refractive powers of the lens systems on the object side become too strong (the absolute values of the negative refractive powers are increased), it becomes difficult to satisfactorily correct the spherical aberration and other various aberrations in a reference state (when in focus at the object at infinity).

As described above, the conditional expressions (6) and (7) are satisfied to maintain the good optical performance while maintaining the size of the entire zoom lens system small.

It is more preferred to set the numerical ranges of the conditional expressions (6) and (7) as follows:

$$-3.0<ff1/fw<-0.6 \quad (6a)$$

$$-5.0<ff2/fw<-0.7 \quad (7a)$$

It is further preferred to set the numerical ranges of the conditional expressions (6a) and (7a) as follows:

$$-2.0<ff1/fw<-0.8 \quad (6b)$$

$$-3.0<ff2/fw<-1.0 \quad (7b)$$

Next, the lens configuration of the zoom lens in each of Embodiments is described.

Numerical data to be provided below expresses each numerical embodiment to be described below in units of mm. The same applies hereinbelow.

Embodiment 1

The zoom lens OL in Embodiment 1 in FIG. 1 is described. The zoom lens OL in Embodiment 1 has a focal length of 15.4 mm to 51.0 mm (an imaging angle of field of 83.1° to 30.0°). The zoom lens OL in Embodiment 1 includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. The interval between adjacent lens units is changed during the zooming.

In the zoom lens OL in Embodiment 1, the third lens unit L3 consists of, as lens subunits in order from the object side to the image side, the first lens subunit Lp1 having the positive refractive power, the second lens subunit Lp2 having the positive refractive power, which moves along the optical axis during the focusing, and the third lens subunit Lp3 having the positive refractive power. The second lens subunit Lp2 consists of one positive lens with the convex surface thereof facing the image side, and has the focal length fp2 of 49.2 mm. Moreover, the focal length fp1 of the first lens subunit Lp1 is 88.2 mm. Moreover, the lens systems (the first lens unit L1 and the second lens unit L2) on the object side of the first lens subunit Lp1 have the negative combined focal length over the entire zoom range (−13.64 mm at the wide angle end).

In Embodiment 1, the ratio of the focal lengths of the first lens subunit Lp1 and the second lens subunit Lp2, which is expressed by the conditional expression (1), is 1.79. In the zoom lens in Embodiment 1, as described above, the first lens subunit Lp1 having the positive refractive power is arranged on the object side of the second lens subunit Lp2 for the focusing, to thereby make an axial ray incident on the second lens subunit Lp2 approximately close to parallel while appropriately setting the positive refractive power of the second lens subunit Lp2.

As a result, the variations in aberration, in particular, the variation in spherical aberration when in focus at the object at infinity and when in focus at the object at close distance is satisfactorily corrected while maintaining the size of the entire zoom lens system small. Moreover, the second lens subunit Lp2 for the focusing consists of a single lens to reduce the weight and this configuration makes it easy to focus at high speed.

Embodiment 2

The zoom lens OL in Embodiment 2 in FIG. 4 is described. The zoom lens OL in Embodiment 2 has a focal length of 15.4 mm to 51.0 mm (an imaging angle of field of 83.1° to 30.0°). The zoom lens OL in Embodiment 2 has the same number of lens units, the same refractive powers of the respective lens units, and the same zoom type such as moving conditions during the zooming as in Embodiment 1. The lens configuration of the third lens unit L3 is also the same as in Embodiment 1.

The second lens subunit Lp2 has the focal length fp2 of 42.1 mm. Moreover, the first lens subunit Lp1 has the focal length fp1 of 203.6 mm. Moreover, the lens systems on the object side of the first lens subunit Lp1 have the negative combined focal length over the entire zoom range (−14.84 mm at the wide angle end). In Embodiment 2, the ratio of the focal lengths of the first lens subunit Lp1 and the second lens subunit Lp2, which is expressed by the conditional expression (1), is 4.84. The configuration of the third lens unit L3 and the effects obtained by the configuration are the same as in Embodiment 1.

Embodiment 3

The zoom lens OL in Embodiment 3 in FIG. 7 is described. The zoom lens OL in Embodiment 3 has a focal length of 15.4 mm to 51.0 mm (an imaging angle of field of 83.1° to 30.0°). The zoom lens OL in Embodiment 3 consists of, in order from the object side to the image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power, and a seventh lens unit L7 having a positive refractive power.

The interval between adjacent lens units is changed during the zooming. In the zoom lens OL in Embodiment 3, the third lens unit L3 corresponds to the first lens subunit Lp1 having the positive refractive power. The fourth lens unit L4 corresponds to the second lens subunit Lp2 having the positive refractive power, which moves along the optical axis during the focusing. The fifth lens unit L5 corresponds to the third lens subunit Lp3 having the positive refractive power. The second lens subunit Lp2 consists of a single positive lens with the convex surface thereof facing the image side, and has the focal length fp2 of 49.8 mm. Moreover, the focal length fp1 of the first lens subunit Lp1 is 88.9 mm. Moreover, the lens systems on the object side of the first lens subunit Lp1 have the negative combined focal length over the entire zoom range (−13.84 mm at the wide angle end).

In Embodiment 3, the ratio of the focal lengths of the first lens subunit Lp1 and the second lens subunit Lp2, which is expressed by the conditional expression (1), is 1.79. In the zoom lens in Embodiment 3, as described above, the first lens subunit Lp1 having the positive refractive power is arranged on the object side of the second lens subunit Lp2 for the focusing, to thereby make an axial ray incident on the second lens subunit Lp2 approximately close to parallel while appropriately setting the refractive power of the second lens subunit Lp2.

As a result, the variations in aberration, in particular, the variation in spherical aberration when in focus at the object at infinity and when in focus at the object at close distance is satisfactorily corrected while maintaining the size of the entire zoom lens system small. Moreover, the second lens subunit Lp2 for the focusing consists of a single lens to reduce the weight and this configuration makes it easy to focus at high speed.

Embodiment 4

The zoom lens OL in Embodiment 4 in FIG. 10 is described. The zoom lens OL in Embodiment 4 has a focal length of 15.4 mm to 51.0 mm (an imaging angle of field of 83.1° to 30.0°). The zoom lens OL in Embodiment 4 has the same zoom type as in Embodiment 1.

In the zoom lens OL in Embodiment 4, the third lens unit L3 corresponds to the first lens subunit Lp1 having the positive refractive power. The fourth lens unit L4 corresponds to the second lens subunit Lp2 having the positive refractive power, which moves along the optical axis during the focusing. The fifth lens unit L5 corresponds to the third lens subunit Lp3 having the positive refractive power. The second lens subunit Lp2 consists of one positive lens with the convex surface thereof facing the image side, and has the focal length fp2 of 43.8 mm. Moreover, the focal length fp1 of the first lens subunit Lp1 is 166.7 mm. Moreover, the lens systems on the object side of the first lens subunit Lp1 have the negative combined focal length over the entire zoom range (−15.03 mm at the wide angle end).

In Embodiment 4, the ratio of the focal lengths of the first lens subunit Lp1 and the second lens subunit Lp2, which is expressed by the conditional expression (1), is 3.84. In the zoom lens in Embodiment 4, as described above, the first lens subunit Lp1 having the positive refractive power is arranged on the object side of the second lens subunit Lp2 for the focusing, to thereby make an axial ray incident on the second lens subunit Lp2 approximately close to parallel while appropriately setting the refractive power of the second lens subunit Lp2.

As a result, the variations in aberration, in particular, the variation in spherical aberration when in focus at the object at infinity and when in focus at the object at close distance is satisfactorily corrected while maintaining the size of the entire zoom lens system small. Moreover, the second lens subunit Lp2 for the focusing consists of a single lens to reduce the weight and this configuration makes it easy to focus at high speed.

Embodiment 5

The zoom lens OL in Embodiment 5 in FIG. 13 is described. The zoom lens OL in Embodiment 5 has a focal length of 15.4 mm to 45.0 mm (an imaging angle of field of 83.1° to 33.8°). The zoom lens OL in Embodiment 5 consists of, in order from the object side to the image side, a first lens unit L1 having a negative refractive power, a second lens unit L2 having a positive refractive power, a third lens unit L3 having a negative refractive power, and a fourth lens unit L4 having a positive refractive power.

The interval between adjacent lens units is changed during the zooming. In the zoom lens OL in Embodiment 5, the second lens unit L2 includes, as lens subunits in order from the object side to the image side, the first lens subunit Lp1 having the positive refractive power, the second lens subunit Lp2 having the positive refractive power, which moves along the optical axis during the focusing, and the third lens subunit Lp3 having the positive refractive power. The second lens subunit Lp2 includes one positive lens with the convex surface thereof facing the image side, and has the focal length fp2 of 92.9 mm. Moreover, the focal length fp1 of the first lens subunit Lp1 is 230.0 mm. Moreover, the lens systems on the object side of the first lens subunit Lp1 have the negative combined focal length over the entire zoom range (−25.44 mm at the wide angle end).

In Embodiment 5, the ratio of the focal lengths of the first lens subunit Lp1 and the second lens subunit Lp2, which is expressed by the conditional expression (1), is 2.47. In the zoom lens in Embodiment 5, as described above, the first lens subunit Lp1 having the positive refractive power is arranged on the object side of the second lens subunit Lp2 for the focusing, to thereby make an axial ray incident on the second lens subunit Lp2 approximately close to parallel while appropriately setting the refractive power of the second lens subunit Lp2.

As a result, the variations in aberration, in particular, the variation in spherical aberration when in focus at the object at infinity and when in focus at the object at close distance is satisfactorily corrected while maintaining the size of the entire zoom lens system small. Moreover, the second lens subunit Lp2 for the focusing consists of a single lens to reduce the weight and this configuration makes it easy to focus at high speed.

Embodiment 6

The zoom lens OL in Embodiment 6 in FIG. 16 is described. The zoom lens OL in Embodiment 6 has a focal length of 18.4 mm to 292.0 mm (an imaging angle of field of 73.2° to 5.4°). The zoom lens OL in Embodiment 6 has the same zoom type as in Embodiment 3.

In the zoom lens OL in Embodiment 6, the third lens unit L3 corresponds to the first lens subunit Lp1 having the positive refractive power. The fourth lens unit L4 corresponds to the second lens subunit Lp2 having the positive refractive power, which moves along the optical axis during the focusing. The fifth lens unit L5 corresponds to the third lens subunit Lp3 having the positive refractive power. The second lens subunit Lp2 consists of a single positive lens with the convex surface thereof facing the image side, and has the focal length fp2 of 67.2 mm. Moreover, the focal length fp1 of the first lens subunit Lp1 is 126.0 mm. Moreover, the lens systems on the object side of the first lens subunit Lp1 have the negative combined focal length over the entire zoom range (−18.34 mm at the wide angle end).

In Embodiment 6, the ratio of the focal lengths of the first lens subunit Lp1 and the second lens subunit Lp2, which is expressed by the conditional expression (1), is 1.88. In the zoom lens in Embodiment 6, as described above, the first lens subunit Lp1 having the positive refractive power is arranged on the object side of the second lens subunit Lp2 for the focusing, to thereby make an axial ray incident on the second lens subunit Lp2 approximately close to parallel while appropriately setting the refractive power of the second lens subunit Lp2.

As a result, the variations in aberration, in particular, the variation in spherical aberration when in focus at the object at infinity and when in focus at the object at close distance is satisfactorily corrected while maintaining the size of the entire zoom lens system small. Moreover, the second lens subunit Lp2 for the focusing consists of a single lens to reduce the weight and this configuration makes it easy to focus at high speed.

FIG. 19 is a schematic diagram of a main part of a single-lens reflex camera. In FIG. 19, an imaging optical system 10 includes a zoom lens 1 of any one of Embodiments 1 to 6. The zoom lens 1 is held by a lens barrel 2 as a holding member. 20 is a camera main body. The camera main body 20 includes a quick return mirror 3, a focusing plate 4, a penta roof prism 5, an eyepiece 6, and the like. The quick return mirror 3 reflects a ray from the imaging optical system 10 upward. The focusing plate 4 is arranged at an image forming position of the imaging optical system 10. The penta roof prism 5 converts a reverse image formed on the focusing plate 4 into an erect image.

An observer observes the erect image through the eyepiece 6. As a photosensitive plane 7, there is arranged a solid-state image pickup element (photoelectric transducer) such as a CCD sensor or a CMOS sensor for receiving the image, or a silver halide film. When taking an image, the quick return mirror 3 is retracted from the optical path, and an image is formed on the photosensitive plane 7 by the imaging optical system 10. In this way, by applying the zoom lens of the present invention to an image pickup apparatus such as a single-lens reflex camera or the like, it is possible to provide optical equipment having high optical performance.

Other than that, the zoom lens of the present invention can be similarly applied to a single-lens reflex camera with a mirror lens having no quick return mirror. Other than that, the zoom lens of the present invention can be applied not only to an image pickup apparatus, such as a digital camera, a video camera, and a silver-halide film camera but also to optical equipment such as a telescope, binoculars, a copying machine, and a projector.

The exemplary embodiments of the present invention are described above, but the present invention is not limited to those embodiments and can be modified and changed variously within the scope of the gist thereof.

Now, there are described specific numerical data of the zoom lenses of Numerical Embodiments 1 to 6. Symbol i represents an order from the object side. The surface number i is an order from the object side. Symbol Ri represents a radius of curvature (mm), and Di represents an interval between the i-th surface and the (i+1)th surface (mm). Symbols Ndi and vdi respectively represent a refractive index and an Abbe constant of a medium between the i-th surface and the (i+1)th surface with respect to the d-line. In addition, BF represents back focus and a distance from the final lens to an image plane. The entire lens length is a distance from the first lens surface to the image plane. Symbol ω represents a half angle of field.

In addition, an aspheric surface is indicated by a suffix "*" of the surface number. An aspheric surface shape is expressed by the following equation, where X represents a displacement from a surface vertex in the optical axis direction, h represents a height from the optical axis in the direction perpendicular to the optical axis, R represents a paraxial curvature radius, k represents a conic constant, and B, C, D, E, ... represent aspheric coefficients of individual orders.

$$X(h) = \frac{(1/r)h^2}{1 + \sqrt{\{1 - (1 + K)(h/r)^2\}}} + Bh^4 + Ch^6 + Dh^8 + Eh^{10} \ldots$$

Further, "E±XX" in each aspheric coefficient means "×10^{±XX}". Values relating to the individual conditional expressions described above are shown in Table 1. Values corresponding to the individual conditional expressions are shown in Table 2.

[Numerical Embodiment 1]
Unit: mm

| Surface number | R | D | Nd | νd | Light beam effective diameter |
|---|---|---|---|---|---|
| 1 | 482.978 | 1.60 | 1.84666 | 23.9 | 53.21 |
| 2 | 71.668 | 6.03 | 1.77250 | 49.6 | 49.52 |
| 3 | −1392.664 | 0.15 | | | 48.57 |
| 4 | 36.831 | 5.32 | 1.77250 | 49.6 | 44.00 |
| 5 | 71.929 | (Variable) | | | 42.77 |
| 6 | 31.760 | 1.10 | 1.88300 | 40.8 | 24.87 |
| 7 | 10.149 | 6.49 | | | 17.74 |
| 8* | −36.364 | 0.80 | 1.85135 | 40.1 | 17.52 |
| 9* | 22.658 | 0.15 | | | 16.76 |
| 10 | 23.269 | 4.97 | 1.71736 | 29.5 | 16.78 |
| 11 | −23.348 | 0.88 | | | 16.22 |
| 12 | −16.482 | 0.80 | 1.88300 | 40.8 | 15.78 |
| 13 | 71.958 | 2.48 | 1.85478 | 24.8 | 15.82 |
| 14 | −38.994 | (Variable) | | | 15.84 |
| 15 | 4626.732 | 1.67 | 1.48749 | 70.2 | 14.35 |
| 16 | −43.406 | 0.80 | | | 14.68 |
| 17 | 72.648 | 2.07 | 1.66672 | 48.3 | 15.22 |
| 18 | −59.215 | 4.52 | | | 15.32 |
| 19 (Stop) | ∞ | 0.89 | | | 15.21 |
| 20 | 35.975 | 4.09 | 1.49700 | 81.5 | 15.17 |
| 21 | −18.955 | 0.80 | 1.85478 | 24.8 | 14.91 |
| 22 | −32.041 | (Variable) | | | 15.04 |
| 23 | −35.551 | 3.72 | 1.84666 | 23.9 | 13.40 |
| 24 | −15.868 | 0.76 | 1.80400 | 46.6 | 13.35 |
| 25 | 64.771 | (Variable) | | | 13.26 |
| 26* | 97.914 | 3.07 | 1.58313 | 59.4 | 17.84 |
| 27 | −30.567 | 0.15 | | | 18.41 |
| 28 | 173.729 | 0.80 | 1.85478 | 24.8 | 19.01 |
| 29 | 23.812 | 5.03 | 1.59522 | 67.7 | 19.32 |
| 30 | −44.262 | (Variable) | | | 19.87 |
| Image plane | ∞ | | | | |

Aspheric surface data

| Conic constant K | Coefficient of fourth order B | Coefficient of sixth order C | Coefficient of eighth order D | Coefficient of tenth order E | Coefficient of twelfth order F |
|---|---|---|---|---|---|
| Eighth surface | | | | | |
| 0.0000E+00 | 7.8261E−06 | 1.3747E−07 | −4.9234E−09 | 3.2813E−11 | 0.0000E+00 |
| Ninth surface | | | | | |
| 0.0000E+00 | −3.2909E−05 | 1.3147E−07 | −5.9252E−09 | 3.7154E−11 | 0.0000E+00 |
| Twenty-sixth surface | | | | | |
| 0.0000E+00 | −1.3041E−05 | 2.6488E−06 | −5.1484E−11 | −3.7427E−13 | 0.0000E+00 |

| Various data | Wide angle end | Intermediate | Telephoto end |
|---|---|---|---|
| Focal length | 15.40 | 20.46 | 51.00 |
| Fno | 2.80 | 3.00 | 4.30 |
| ω (degree) | 41.57 | 33.73 | 14.99 |
| Image height | 13.66 | 13.66 | 13.66 |
| Total lens length | 119.65 | 123.99 | 149.53 |
| BF | 35.93 | 38.66 | 50.56 |

-continued

[Numerical Embodiment 1]
Unit: mm

| | | | |
|---|---|---|---|
| Entrance pupil position | 23.15 | 32.38 | 83.52 |
| Exit pupil position | −57.87 | −48.39 | −36.10 |
| Front principal point position | 36.02 | 48.03 | 104.50 |
| Rear prinipal point position | 20.53 | 18.20 | −0.44 |

Variable interval

| Surface number | Wide angle end | Intermediate | Telephoto end |
|---|---|---|---|
| 5 | 1.00 | 6.55 | 25.74 |
| 14 | 11.83 | 8.34 | 1.50 |
| 22 | 1.70 | 4.31 | 11.60 |
| 25 | 10.06 | 7.01 | 1.00 |
| 30 | 35.93 | 38.66 | 50.56 |

Unit data

| Unit | First surface | Focal length | Lens structure length | Front principal point position | Rear principal point position |
|---|---|---|---|---|---|
| 1 | 1 | 82.11 | 13.11 | 1.44 | −5.81 |
| 2 | 6 | −10.36 | 17.67 | 2.60 | −10.26 |
| 3 | 15 | 21.15 | 14.82 | 5.73 | −7.02 |
| 4 | 23 | −29.31 | 4.49 | 0.73 | −1.67 |
| 5 | 26 | 31.92 | 9.05 | 3.04 | −2.81 |

Single lens data

| Lens | First surface | Focal length |
|---|---|---|
| 1 | 1 | −99.580 |
| 2 | 2 | 88.390 |
| 3 | 4 | 91.650 |
| 4 | 6 | −17.300 |
| 5 | 8 | −16.300 |
| 6 | 10 | 17.000 |
| 7 | 12 | −15.120 |
| 8 | 13 | 29.890 |
| 9 | 15 | 88.220 |
| 10 | 17 | 49.240 |
| 11 | 20 | 25.610 |
| 12 | 21 | −55.870 |
| 13 | 23 | 31.150 |
| 14 | 24 | −15.790 |
| 15 | 26 | 40.300 |
| 16 | 28 | −32.360 |
| 17 | 29 | 26.750 |

[Numerical Embodiment 2]
Unit: mm

| Surface number | R | D | Nd | vd | Light beam effective diameter |
|---|---|---|---|---|---|
| 1 | 423.598 | 1.60 | 1.84666 | 23.9 | 53.25 |
| 2 | 72.037 | 6.19 | 1.77250 | 49.6 | 50.90 |
| 3 | −6679.192 | 0.15 | | | 50.42 |
| 4 | 41.912 | 5.72 | 1.77250 | 49.6 | 46.21 |
| 5 | 100.351 | (Variable) | | | 45.03 |
| 6* | 72.877 | 1.10 | 1.85135 | 40.1 | 26.41 |
| 7 | 12.171 | 6.08 | | | 19.18 |
| 8 | −38.888 | 0.80 | 1.88300 | 40.8 | 18.89 |
| 9 | 28.343 | 0.15 | | | 17.89 |
| 10 | 23.619 | 5.23 | 1.71736 | 29.5 | 17.90 |
| 11 | −25.641 | 0.92 | | | 17.27 |
| 12 | −17.876 | 0.80 | 1.88300 | 40.8 | 16.79 |
| 13 | 34.982 | 3.20 | 1.85478 | 24.8 | 16.72 |
| 14 | −44.204 | (Variable) | | | 16.71 |
| 15 | 202.889 | 1.87 | 1.60311 | 60.6 | 14.71 |
| 16 | −310.096 | 0.50 | | | 15.09 |

-continued

[Numerical Embodiment 2]
Unit: mm

| | | | | | |
|---|---|---|---|---|---|
| 17 | 61.843 | 2.21 | 1.69680 | 55.5 | 15.47 |
| 18 | −54.972 | 3.87 | | | 15.59 |
| 19 (Stop) | ∞ | 0.75 | | | 15.45 |
| 20 | 31.813 | 3.97 | 1.49700 | 81.5 | 15.39 |
| 21 | −22.163 | 0.80 | 2.00069 | 25.5 | 15.08 |
| 22 | −40.365 | (Variable) | | | 15.14 |
| 23 | −38.046 | 3.06 | 1.90366 | 31.3 | 13.70 |
| 24 | −12.466 | 0.76 | 1.83481 | 42.7 | 13.73 |
| 25 | 174.226 | (Variable) | | | 13.65 |
| 26* | −158.302 | 1.97 | 1.58313 | 59.4 | 16.31 |
| 27 | −56.993 | 0.15 | | | 17.12 |
| 28 | 136.986 | 0.80 | 1.85478 | 24.8 | 17.79 |
| 29 | 29.060 | 5.21 | 1.59522 | 67.7 | 18.31 |
| 30 | −26.277 | (Variable) | | | 19.13 |
| Image plane | ∞ | | | | |

Aspheric surface data

| Conic constant K | Coefficient of fourth order B | Coefficient of sixth order C | Coefficient of eighth order D | Coefficient of tenth order E | Coefficient of twelfth order F |
|---|---|---|---|---|---|
| | | Sixth surface | | | |
| 0.0000E+00 | 1.9532E−05 | −7.0090E−08 | 4.5847E−10 | −2.0703E−12 | 4.6572E−15 |
| | | Twenty-sixth surface | | | |
| 0.0000E+00 | −2.2536E−05 | 2.9149E−08 | −7.7513E−10 | 5.0708E−12 | 0.0000E+00 |

| Various data | Wide angle end | Intermediate | Telephoto end |
|---|---|---|---|
| Focal length | 15.40 | 20.00 | 51.00 |
| Fno | 2.80 | 3.00 | 4.11 |
| ω (degree) | 41.57 | 34.33 | 14.99 |
| Image height | 13.66 | 13.66 | 13.66 |
| Total lens length | 122.23 | 124.98 | 152.23 |
| BF | 35.50 | 39.72 | 55.29 |
| Entrance pupil position | 24.18 | 31.06 | 85.88 |
| Exit pupil position | −55.02 | −45.81 | −35.32 |
| Front principal point position | 36.96 | 46.38 | 108.17 |
| Rear principal point position | 20.10 | 19.72 | 4.29 |

Variable interval

| Surface number | Wide angle end | Intermediate | Telephoto end |
|---|---|---|---|
| 5 | 1.32 | 5.63 | 26.46 |
| 14 | 14.74 | 10.13 | 1.50 |
| 22 | 2.71 | 4.75 | 10.11 |
| 25 | 10.08 | 6.88 | 1.00 |
| 30 | 35.50 | 39.72 | 55.29 |

Unit data

| Unit | First surface | Focal length | Lens structure length | Front principal point position | Rear principal point position |
|---|---|---|---|---|---|
| 1 | 1 | 81.67 | 13.66 | 2.06 | −5.55 |
| 2 | 6 | −11.17 | 18.28 | 2.17 | −11.00 |
| 3 | 15 | 23.33 | 13.97 | 4.71 | −6.50 |
| 4 | 23 | −43.43 | 3.82 | 0.03 | −1.98 |
| 5 | 26 | 38.08 | 8.14 | 4.57 | −0.56 |

Single lens data

| Lens | First surface | Focal length |
|---|---|---|
| 1 | 1 | −102.730 |
| 2 | 2 | 92.290 |
| 3 | 4 | 89.360 |
| 4 | 6 | −17.310 |
| 5 | 8 | −18.460 |
| 6 | 10 | 17.930 |

| [Numerical Embodiment 2] Unit: mm | | |
|---|---|---|
| 7 | 12 | −13.300 |
| 8 | 13 | 23.280 |
| 9 | 15 | 203.630 |
| 10 | 17 | 42.090 |
| 11 | 20 | 26.940 |
| 12 | 21 | −50.220 |
| 13 | 23 | 19.410 |
| 14 | 24 | −13.910 |
| 15 | 26 | 151.630 |
| 16 | 28 | −43.300 |
| 17 | 29 | 24.030 |

[Numerical Embodiment 3]
Unit: mm

| Surface number | R | D | Nd | νd | Light beam effective diameter |
|---|---|---|---|---|---|
| 1 | 454.147 | 1.60 | 1.84666 | 23.9 | 53.20 |
| 2 | 69.130 | 6.19 | 1.77250 | 49.6 | 49.44 |
| 3 | −1518.967 | 0.15 | | | 48.45 |
| 4 | 36.349 | 5.21 | 1.77250 | 49.6 | 43.09 |
| 5 | 71.221 | (Variable) | | | 41.87 |
| 6 | 32.401 | 1.10 | 1.88300 | 40.8 | 24.89 |
| 7 | 10.216 | 6.47 | | | 17.78 |
| 8* | −36.665 | 0.80 | 1.85135 | 40.1 | 17.53 |
| 9* | 22.837 | 0.16 | | | 16.76 |
| 10 | 23.456 | 5.06 | 1.71736 | 29.5 | 16.77 |
| 11 | −23.422 | 0.89 | | | 16.18 |
| 12 | −16.412 | 0.80 | 1.88300 | 40.8 | 15.73 |
| 13 | 83.694 | 2.54 | 1.85478 | 24.8 | 15.77 |
| 14 | −38.102 | (Variable) | | | 15.79 |
| 15 | −2864.166 | 1.64 | 1.48749 | 70.2 | 14.13 |
| 16 | −42.698 | (Variable) | | | 14.45 |
| 17 | 74.351 | 2.08 | 1.66672 | 48.3 | 15.38 |
| 18 | −59.215 | (Variable) | | | 15.49 |
| 19 (Stop) | ∞ | 0.87 | | | 15.39 |
| 20 | 36.280 | 4.43 | 1.49700 | 81.5 | 15.35 |
| 21 | −18.962 | 0.80 | 1.85478 | 24.8 | 15.03 |
| 22 | −31.970 | (Variable) | | | 15.08 |
| 23 | −35.606 | 3.01 | 1.84666 | 23.9 | 13.33 |
| 24 | −15.641 | 0.76 | 1.80400 | 46.6 | 13.28 |
| 25 | 64.483 | (Variable) | | | 13.17 |
| 26* | 98.271 | 3.13 | 1.58313 | 59.4 | 18.17 |
| 27 | −30.654 | 0.15 | | | 18.74 |
| 28 | 174.819 | 0.80 | 1.85478 | 24.8 | 19.34 |
| 29 | 23.473 | 5.21 | 1.59522 | 67.7 | 19.65 |
| 30 | −44.209 | (Variable) | | | 20.21 |
| Image plane | ∞ | | | | |

Aspheric surface data

| Conic constant K | Coefficient of fourth order B | Coefficient of sixth order C | Coefficient of eighth order D | Coefficient of tenth order E | Coefficient of twelfth order F |
|---|---|---|---|---|---|
| Eighth surface | | | | | |
| 0.0000E+00 | 5.7939E−06 | 1.7263E−07 | −5.0882E−09 | 3.3173E−11 | 0.0000E+00 |
| Ninth surface | | | | | |
| 0.0000E+00 | −3.4964E−05 | 1.8797E−07 | −6.4153E−09 | 3.9135E−11 | 0.0000E+00 |
| Twenty-sixth surface | | | | | |
| 0.0000E+00 | −1.3274E−05 | 3.6083E−08 | −1.8284E−10 | 2.8850E−13 | 0.0000E+00 |

-continued

[Numerical Embodiment 3]
Unit: mm

Various data

| | Wide angle end | Intermediate | Telephoto end |
|---|---|---|---|
| Focal length | 15.40 | 20.64 | 51.00 |
| Fno | 2.80 | 3.00 | 4.30 |
| ω (degree) | 41.57 | 33.49 | 14.99 |
| Image height | 13.66 | 13.66 | 13.66 |
| Total lens length | 119.90 | 124.20 | 148.63 |
| BF | 35.50 | 38.23 | 49.86 |
| Entrance pupil position | 23.18 | 32.77 | 81.71 |
| Exit pupil position | −61.45 | −50.93 | −36.09 |
| Front principal point position | 36.13 | 48.64 | 102.45 |
| Rear principal point position | 20.10 | 17.59 | −1.14 |

Variable interval

| Surface number | Wide angle end | Intermediate | Telephoto end |
|---|---|---|---|
| 5 | 1.00 | 6.73 | 25.02 |
| 14 | 11.56 | 7.82 | 1.50 |
| 16 | 2.06 | 2.13 | 0.80 |
| 18 | 3.35 | 3.27 | 4.60 |
| 22 | 2.18 | 4.84 | 11.99 |
| 25 | 10.40 | 7.31 | 1.00 |
| 30 | 35.50 | 38.23 | 49.86 |

Unit data

| Unit | First surface | Focal length | Lens structure length | Front principal point position | Rear principal point position |
|---|---|---|---|---|---|
| 1 | 1 | 80.82 | 13.15 | 1.57 | −5.70 |
| 2 | 6 | −10.47 | 17.82 | 2.54 | −10.47 |
| 3 | 15 | 88.90 | 1.64 | 1.12 | 0.02 |
| 4 | 17 | 49.75 | 2.08 | 0.70 | −0.56 |
| 5 | 19 | 46.95 | 6.10 | 2.54 | −1.81 |
| 6 | 23 | −29.41 | 3.77 | 0.62 | −1.40 |
| 7 | 26 | 32.20 | 9.29 | 3.13 | −2.89 |

Single lens data

| Lens | First surface | Focal length |
|---|---|---|
| 1 | 1 | −96.490 |
| 2 | 2 | 85.740 |
| 3 | 4 | 90.230 |
| 4 | 6 | −17.300 |
| 5 | 8 | −16.430 |
| 6 | 10 | 17.110 |
| 7 | 12 | −15.480 |
| 8 | 13 | 30.930 |
| 9 | 15 | 88.900 |
| 10 | 17 | 49.750 |
| 11 | 20 | 25.740 |
| 12 | 21 | −56.110 |
| 13 | 23 | 30.810 |
| 14 | 24 | −15.590 |
| 15 | 26 | 40.430 |
| 16 | 28 | −31.800 |
| 17 | 29 | 26.520 |

[Numerical Embodiment 4]
Unit: mm

| Surface number | R | D | Nd | vd | Light beam effective diameter |
|---|---|---|---|---|---|
| 1 | 347.637 | 1.60 | 1.84666 | 23.9 | 52.96 |
| 2 | 69.242 | 5.74 | 1.77250 | 49.6 | 48.98 |
| 3 | 2752.474 | 0.15 | | | 48.53 |
| 4 | 43.073 | 5.66 | 1.77250 | 49.6 | 44.81 |
| 5 | 106.101 | (Variable) | | | 43.44 |
| 6* | 69.081 | 1.10 | 1.85135 | 40.1 | 26.26 |

-continued

| | | | | | |
|---|---|---|---|---|---|
| 7 | 12.290 | 5.98 | | | 19.15 |
| 8 | −38.888 | 0.80 | 1.88300 | 40.8 | 18.83 |
| 9 | 28.343 | 0.15 | | | 17.74 |
| 10 | 23.883 | 5.00 | 1.71736 | 29.5 | 17.72 |
| 11 | −27.151 | 1.05 | | | 17.06 |
| 12 | −17.464 | 0.80 | 1.88300 | 40.8 | 16.59 |
| 13 | 38.585 | 3.16 | 1.85478 | 24.8 | 16.56 |
| 14 | −39.422 | (Variable) | | | 16.56 |
| 15 | 210.267 | 1.92 | 1.60311 | 60.6 | 14.37 |
| 16 | −192.057 | (Variable) | | | 14.76 |
| 17 | 64.744 | 2.17 | 1.69680 | 55.5 | 15.45 |
| 18 | −55.924 | (Variable) | | | 15.56 |
| 19 (Stop) | ∞ | 0.90 | | | 15.44 |
| 20 | 32.336 | 4.07 | 1.49700 | 81.5 | 15.38 |
| 21 | −22.418 | 0.80 | 2.00069 | 25.5 | 15.04 |
| 22 | −40.238 | (Variable) | | | 15.10 |
| 23 | −36.749 | 2.97 | 1.90366 | 31.3 | 13.70 |
| 24 | −12.238 | 0.76 | 1.83481 | 42.7 | 13.74 |
| 25 | 182.277 | (Variable) | | | 13.66 |
| 26* | −160.953 | 1.95 | 1.58313 | 59.4 | 16.47 |
| 27 | −57.818 | 0.15 | | | 17.28 |
| 28 | 132.067 | 0.80 | 1.85478 | 24.8 | 17.96 |
| 29 | 28.303 | 5.37 | 1.59522 | 67.7 | 18.48 |
| 30 | −26.136 | (Variable) | | | 19.32 |
| Image plane | ∞ | | | | |

Aspheric surface data

| Conic constant K | Coefficient of fourth order B | Coefficient of sixth order C | Coefficient of eighth order D | Coefficient of tenth order E | Coefficient of twelfth order F |
|---|---|---|---|---|---|
| Sixth surface | | | | | |
| 0.0000E+00 | 1.9037E−05 | −5.9362E−08 | 3.8915E−10 | −1.7668E−12 | 4.4706E−15 |
| Twenty-sixth surface | | | | | |
| 0.0000E+00 | −2.1803E−05 | 1.4645E−08 | −5.5371E−10 | 4.0638E−12 | 0.0000E+00 |

Various data

| | Wide angle end | Intermediate | Telephoto end |
|---|---|---|---|
| Focal length | 15.40 | 20.00 | 51.00 |
| Fno | 2.80 | 3.00 | 4.14 |
| ω (degree) | 41.57 | 34.33 | 14.99 |
| Image height | 13.66 | 13.66 | 13.66 |
| Total lens length | 121.12 | 123.42 | 151.12 |
| BF | 35.50 | 39.78 | 55.98 |
| Entrance pupil position | 23.77 | 29.74 | 82.16 |
| Exit pupil position | −57.37 | −48.32 | −34.75 |
| Front principal point position | 36.62 | 45.20 | 104.49 |
| Rear principal point position | 20.10 | 19.78 | 4.98 |

Variable interval

| Surface number | Wide angle end | Intermediate | Telephoto end |
|---|---|---|---|
| 5 | 1.25 | 5.14 | 25.79 |
| 14 | 14.22 | 9.37 | 1.50 |
| 16 | 1.40 | 1.47 | 0.15 |
| 18 | 2.78 | 2.72 | 4.04 |
| 22 | 2.43 | 4.54 | 9.61 |
| 25 | 10.48 | 7.35 | 1.00 |
| 30 | 35.50 | 39.78 | 55.98 |

Unit data

| Unit | First surface | Focal length | Lens structure length | Front principal point position | Rear principal point position |
|---|---|---|---|---|---|
| 1 | 1 | 82.58 | 13.15 | 1.80 | −5.53 |
| 2 | 6 | −11.34 | 18.04 | 2.17 | −10.95 |
| 3 | 15 | 166.73 | 1.92 | 0.63 | −0.57 |
| 4 | 17 | 43.38 | 2.17 | 0.69 | −0.60 |

| | | -continued | | | |
|---|---|---|---|---|---|
| 5 | 19 | 56.39 | 5.76 | 1.86 | −2.22 |
| 6 | 23 | −42.48 | 3.73 | 0.01 | −1.96 |
| 7 | 26 | 38.05 | 8.27 | 4.65 | −0.57 |

| Single lens data | | |
|---|---|---|
| Lens | First surface | Focal length |
| 1 | 1 | −102.390 |
| 2 | 2 | 91.860 |
| 3 | 4 | 90.330 |
| 4 | 6 | −17.720 |
| 5 | 8 | −18.460 |
| 6 | 10 | 18.470 |
| 7 | 12 | −13.530 |
| 8 | 13 | 23.250 |
| 9 | 15 | 166.730 |
| 10 | 17 | 43.380 |
| 11 | 20 | 27.310 |
| 12 | 21 | −51.750 |
| 13 | 23 | 19.200 |
| 14 | 24 | −13.710 |
| 15 | 26 | 153.670 |
| 16 | 28 | −42.290 |
| 17 | 29 | 23.700 |

[Numerical Embodiment 5]
Unit: mm

| Surface number | R | D | Nd | vd | Light beam effective diameter |
|---|---|---|---|---|---|
| 1 | 35.910 | 1.80 | 1.83481 | 42.7 | 38.27 |
| 2 | 15.932 | 10.94 | | | 29.18 |
| 3* | −90.602 | 1.50 | 1.58313 | 59.4 | 29.08 |
| 4* | 23.441 | 2.77 | | | 28.84 |
| 5 | 46.525 | 3.79 | 1.84666 | 23.9 | 29.22 |
| 6 | −607.318 | (Variable) | | | 29.00 |
| 7 | 57.644 | 1.80 | 1.48749 | 70.2 | 17.71 |
| 8 | 117.611 | 0.50 | | | 17.78 |
| 9 | 86.076 | 1.89 | 1.51633 | 64.1 | 17.86 |
| 10 | −107.609 | 7.96 | | | 17.89 |
| 11 (Stop) | ∞ | 1.70 | | | 18.68 |
| 12 | 31.970 | 5.76 | 1.59522 | 67.7 | 19.10 |
| 13 | −26.162 | 0.80 | 1.85478 | 24.8 | 18.71 |
| 14 | −79.620 | (Variable) | | | 18.67 |
| 15 | −66.569 | 2.43 | 1.84666 | 23.9 | 15.87 |
| 16 | −20.036 | 1.00 | 1.80610 | 40.9 | 16.08 |
| 17 | 62.435 | (Variable) | | | 16.60 |
| 18* | 141.045 | 3.49 | 1.58313 | 59.4 | 18.72 |
| 19 | −24.998 | 0.15 | | | 19.23 |
| 20 | 110.102 | 2.99 | 1.49700 | 81.5 | 19.51 |
| 21 | −37.800 | 1.00 | 1.85026 | 32.3 | 19.53 |
| 22 | ∞ | (Variable) | | | 19.79 |
| Image plane | ∞ | | | | |

Aspheric surface data

| Conic constant K | Coefficient of fourth order B | Coefficient of sixth order C | Coefficient of eighth order D | Coefficient of tenth order E | Coefficient of twelfth order F |
|---|---|---|---|---|---|
| Third surface | | | | | |
| 0.0000E+00 | 1.2029E−05 | −4.7250E−08 | −3.7327E−11 | 8.0522E−13 | −1.5699E−15 |
| Fourth surface | | | | | |
| 0.0000E+00 | −1.8317E−05 | −5.0362E−08 | −4.5008E−10 | 3.0974E−12 | −7.2054E−15 |
| Eighteenth surface | | | | | |
| 0.0000E+00 | −1.5762E−05 | −3.1673E−08 | 1.0413E−09 | −1.3333E−11 | 5.8201E−14 |

-continued

[Numerical Embodiment 5]
Unit: mm

| Various data | Wide angle end | Intermediate | Telephoto end |
|---|---|---|---|
| Focal length | 15.40 | 25.00 | 45.00 |
| Fno | 2.80 | 3.27 | 4.50 |
| ω (degree) | 41.57 | 28.65 | 16.89 |
| Image height | 13.66 | 13.66 | 13.66 |
| Total lens length | 143.51 | 128.94 | 133.48 |
| BF | 35.50 | 44.04 | 63.49 |
| Entrance pupil position | 21.56 | 19.20 | 16.65 |
| Exit pupil position | −51.70 | −45.79 | −34.42 |
| Front principal point position | 34.24 | 37.24 | 40.97 |
| Rear principal point position | 20.10 | 19.04 | 18.49 |

Variable interval

| Surface number | Wide angle end | Intermediate | Telephoto end |
|---|---|---|---|
| 6 | 40.11 | 16.47 | 1.50 |
| 14 | 2.21 | 7.30 | 14.20 |
| 17 | 13.41 | 8.85 | 2.02 |
| 22 | 35.50 | 44.04 | 63.49 |

Unit data

| Unit | First surface | Focal length | Lens structure length | Front principal point position | Rear principal point position |
|---|---|---|---|---|---|
| 1 | 1 | −25.44 | 20.80 | 3.06 | −15.10 |
| 2 | 7 | 32.37 | 20.41 | 8.65 | −9.37 |
| 3 | 15 | −41.90 | 3.43 | 0.90 | −0.95 |
| 4 | 18 | 43.34 | 7.63 | 0.98 | −3.86 |

Single lens data

| Lens | First surface | Focal length |
|---|---|---|
| 1 | 1 | −35.770 |
| 2 | 3 | −31.780 |
| 3 | 5 | 51.180 |
| 4 | 7 | 229.650 |
| 5 | 9 | 92.930 |
| 6 | 12 | 25.100 |
| 7 | 13 | −45.900 |
| 8 | 15 | 33.060 |
| 9 | 16 | −18.720 |
| 10 | 18 | 36.700 |
| 11 | 20 | 57.000 |
| 12 | 21 | −44.460 |

[Numerical Embodiment 6]
Unit: mm

| Surface number | R | D | Nd | vd | Light beam effective diameter |
|---|---|---|---|---|---|
| 1 | 141.789 | 1.80 | 1.91082 | 35.3 | 53.35 |
| 2 | 60.659 | 8.81 | 1.49700 | 81.5 | 52.16 |
| 3 | −489.812 | 0.15 | | | 52.08 |
| 4 | 56.310 | 6.66 | 1.59522 | 67.7 | 51.32 |
| 5 | 297.753 | (Variable) | | | 50.64 |
| 6* | 146.922 | 1.50 | 1.85135 | 40.1 | 28.37 |
| 7 | 18.515 | 5.00 | | | 22.91 |
| 8 | −78.718 | 1.20 | 1.72916 | 54.7 | 22.73 |
| 9 | 22.009 | 4.82 | 1.85478 | 24.8 | 21.22 |
| 10 | −128.226 | 0.61 | | | 20.60 |
| 11 | −64.644 | 1.00 | 1.76385 | 48.5 | 20.41 |
| 12 | 26.205 | 1.99 | 1.85478 | 24.8 | 19.25 |
| 13 | 51.043 | (Variable) | | | 18.90 |
| 14 | 36.221 | 1.80 | 1.74000 | 28.3 | 18.10 |
| 15 | 57.990 | 1.86 | | | 18.22 |
| 16 (Stop) | ∞ | (Variable) | | | 18.68 |

-continued

[Numerical Embodiment 6]
Unit: mm

| | | | | | |
|---|---|---|---|---|---|
| 17 | 4817.464 | 1.99 | 1.72916 | 54.7 | 18.76 |
| 18 | −49.475 | (Variable) | | | 19.00 |
| 19 | 29.514 | 4.87 | 1.49700 | 81.5 | 20.72 |
| 20 | −40.710 | 1.00 | 2.00069 | 25.5 | 20.42 |
| 21 | −206.017 | 0.15 | | | 20.43 |
| 22 | 35.561 | 3.27 | 1.48749 | 70.2 | 20.25 |
| 23 | −108.442 | (Variable) | | | 19.91 |
| 24 | −77.718 | 1.74 | 1.76182 | 26.5 | 15.03 |
| 25 | −27.493 | 1.00 | 1.85135 | 40.1 | 15.03 |
| 26* | 51.684 | 2.57 | | | 15.15 |
| 27 | −23.204 | 1.00 | 1.88300 | 40.8 | 15.39 |
| 28 | −44.058 | (Variable) | | | 16.18 |
| 29* | −693.257 | 4.59 | 1.58313 | 59.4 | 22.30 |
| 30 | −21.723 | 0.15 | | | 22.96 |
| 31 | 89.255 | 6.83 | 1.48749 | 70.2 | 22.89 |
| 32 | −20.637 | 1.00 | 2.00069 | 25.5 | 22.64 |
| 33 | −40.382 | 0.15 | | | 23.32 |
| 34 | 167.649 | 7.28 | 1.80518 | 25.4 | 23.14 |
| 35 | −18.302 | 1.00 | 1.88300 | 40.8 | 22.83 |
| 36 | 102.547 | (Variable) | | | 22.64 |
| Image plane | ∞ | | | | |

Aspheric surface data

| Conic constant K | Coefficient of fourth order B | Coefficient of sixth order C | Coefficient of eighth order D | Coefficient of tenth order E | Coefficient of twelfth order F |
|---|---|---|---|---|---|
| Sixth surface | | | | | |
| 0.0000E+00 | 1.8977E−06 | −6.1390E−09 | 7.3862E−12 | −1.1263E−14 | −4.4518E−18 |
| Twenty-sixth surface | | | | | |
| 0.0000E+00 | −6.4079E−06 | 6.0301E−09 | −8.1907E−11 | 5.7961E−13 | 0.0000E+00 |
| Twenty-ninth surface | | | | | |
| 0.0000E+00 | −9.9316E−06 | 1.7361E−08 | −9.9229E−11 | 3.7909E−13 | 0.0000E+00 |

| Various data | Wide angle end | Intermediate | Telephoto end |
|---|---|---|---|
| Focal length | 18.40 | 55.00 | 292.00 |
| Fno | 3.29 | 4.87 | 6.30 |
| ω (degree) | 36.59 | 13.95 | 2.68 |
| Image height | 13.66 | 13.66 | 13.66 |
| Total lens length | 168.30 | 195.93 | 248.31 |
| BF | 36.09 | 60.42 | 80.44 |
| Entrance pupil position | 31.54 | 78.32 | 351.35 |
| Exit pupil position | −91.94 | −63.54 | −44.86 |
| Front principal point position | 47.30 | 108.91 | −37.13 |
| Rear principal point position | 17.69 | 5.42 | −211.56 |

Variable interval

| Surface number | Wide angle end | Intermediate | Telephoto end |
|---|---|---|---|
| 5 | 1.00 | 25.89 | 66.66 |
| 13 | 31.51 | 9.91 | 1.50 |
| 16 | 8.96 | 9.89 | 0.19 |
| 18 | 3.99 | 3.06 | 12.76 |
| 23 | 1.68 | 6.09 | 9.97 |
| 28 | 9.29 | 4.88 | 1.00 |
| 36 | 36.09 | 60.42 | 80.44 |

Unit data

| Unit | First surface | Focal length | Lens structure length | Front principal point position | Rear principal point position |
|---|---|---|---|---|---|
| 1 | 1 | 107.72 | 17.42 | 5.70 | −5.46 |
| 2 | 6 | −14.17 | 16.12 | 3.86 | −6.31 |
| 3 | 14 | 125.96 | 3.66 | −1.66 | −4.52 |
| 4 | 17 | 67.17 | 1.99 | 1.14 | −0.01 |

-continued

[Numerical Embodiment 6]
Unit: mm

| 5 | 19 | 37.55  | 9.29  | 2.22  | −4.07  |
| 6 | 24 | −20.50 | 6.31  | 1.86  | −2.69  |
| 7 | 29 | 37.74  | 21.00 | −0.18 | −11.92 |

Single lens data

| Lens | First surface | Focal length |
|---|---|---|
| 1 | 1 | −117.630 |
| 2 | 2 | 109.180 |
| 3 | 4 | 115.480 |
| 4 | 6 | −25.020 |
| 5 | 8 | −23.470 |
| 6 | 9 | 22.310 |
| 7 | 11 | −24.300 |
| 8 | 12 | 60.760 |
| 9 | 14 | 125.960 |
| 10 | 17 | 67.170 |
| 11 | 19 | 35.240 |
| 12 | 20 | −50.850 |
| 13 | 22 | 55.340 |
| 14 | 24 | 55.020 |
| 15 | 25 | −20.960 |
| 16 | 27 | −56.790 |
| 17 | 29 | 38.360 |
| 18 | 31 | 35.100 |
| 19 | 32 | −43.270 |
| 20 | 34 | 20.860 |
| 21 | 35 | −17.520 |

TABLE 1

| | Embodiment | | | | | |
|---|---|---|---|---|---|---|
| | 1 | 2 | 3 | 4 | 5 | 6 |
| ff1 | −13.64 | −14.84 | −13.84 | −15.03 | −25.44 | −18.34 |
| ff2 | −22.74 | −18.40 | −23.01 | −19.65 | −38.90 | −31.56 |
| fp1 | 88.22 | 203.63 | 88.90 | 166.73 | 229.65 | 125.96 |
| fp2 | 49.24 | 42.09 | 49.75 | 43.38 | 92.93 | 67.17 |
| βLp1w | 1.67 | 1.24 | 1.66 | 1.31 | 1.53 | 1.72 |
| βLp1t | 1.42 | 1.16 | 1.42 | 1.20 | 1.22 | 1.34 |
| fw | 15.40 | 15.40 | 15.40 | 15.40 | 15.40 | 18.40 |

TABLE 2

| Conditional Expression | Embodiment | | | | | |
|---|---|---|---|---|---|---|
| | 1 | 2 | 3 | 4 | 5 | 6 |
| (1) fp1/fp2 | 1.79 | 4.84 | 1.79 | 3.84 | 2.47 | 1.88 |
| (2) \|βLp1t\| | 1.42 | 1.16 | 1.42 | 1.20 | 1.22 | 1.34 |
| (3) \|βLp1w\| | 1.67 | 1.24 | 1.66 | 1.31 | 1.53 | 1.72 |
| (4) fp1/fw | 5.73 | 13.22 | 5.77 | 10.83 | 14.91 | 6.85 |
| (5) fp2/fw | 3.20 | 2.73 | 3.23 | 2.82 | 6.03 | 3.65 |
| (6) ff1/fw | −0.89 | −0.96 | −0.90 | −0.98 | −1.65 | −1.00 |
| (7) ff2/fw | −1.48 | −1.19 | −1.49 | −1.28 | −2.53 | −1.72 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-026486, filed Feb. 14, 2014, which is hereby incorporated by reference herein in its entirety.

What is claimed is:

1. A zoom lens including a plurality of lens units, in which an interval between adjacent lens units changes during zooming, comprising:
    a first lens subunit having a positive refractive power;
    a second lens subunit having a positive refractive power, which is arranged adjacent to an image side of the first lens subunit; and
    at least one lens unit on an object side of the first lens subunit,
    wherein lens systems arranged on the object side of the first lens subunit Lp1 have a negative combined focal length over an entire zoom range,
    wherein the second lens subunit moves along an optical axis to the image side during focusing from an object at infinity to a proximate object, and
    wherein the zoom lens satisfies the following conditional expression:

$$1.0 < fp1/fp2 < 10.0,$$

where fp1 represents a focal length of the first lens subunit, and fp2 represents a focal length of the second lens subunit.

2. A zoom lens according to claim 1, wherein lens systems arranged on the object side of the second lens subunit have a negative combined focal length over the entire zoom range.

3. A zoom lens according to claim 1, wherein the second lens subunit consists of two or less lenses.

4. A zoom lens according to claim 1, wherein the second lens subunit consists of a single positive lens having a convex surface facing the image side.

5. A zoom lens according to claim 1, wherein the zoom lens satisfies the following conditional expression:

$$1.05 < |\beta Lp1t|,$$

where βLp1t represents a lateral magnification of the first lens subunit at a telephoto end.

6. A zoom lens according to claim 1, wherein the zoom lens satisfies the following conditional expression:

$1.10 \le |\beta Lp1w|$, where $\beta Lp1w$ represents a lateral magnification of the first lens subunit at a wide angle end.

7. A zoom lens according to claim 1, wherein the zoom lens satisfies the following conditional expressions:

$2.0 < fp1/fw < 30.0$; and $1.0 < fp2/fw < 15.0$, where fw represents a focal length of an entire system at a wide angle end.

8. A zoom lens according to claim 1, further comprising a third lens subunit having a positive refractive power arranged adjacent to the image side of the second lens subunit.

9. A zoom lens according to claim 1, wherein the zoom lens satisfies the following conditional expressions:

$-4.0 < ff1/fw < -0.5$; and $-6.0 < ff2/fw < -0.5$, where ff1 represents a combined focal length of the lens systems arranged on the object side of the first lens subunit at a wide angle end, ff2 represents a combined focal length of lens systems arranged on the object side of the second lens subunit at the wide angle end, and fw represents a focal length of the zoom lens at the wide angle end.

10. A zoom lens according to claim 8, wherein the zoom lens consists of, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, each of the first lens unit, the second lens unit, the third lens unit, the fourth lens unit, and the fifth lens unit moving during the zooming, the third lens unit consisting of, in order from the object side to the image side, the first lens subunit, the second lens subunit, and a third lens subunit having a positive refractive power.

11. A zoom lens according to claim 8, wherein the zoom lens consists of, in order from an object side to an image side, a first lens unit having a positive refractive power, a second lens unit having a negative refractive power, a third lens unit having a positive refractive power, a fourth lens unit having a positive refractive power, a fifth lens unit having a positive refractive power, a sixth lens unit having a negative refractive power, and a seventh lens unit having a positive refractive power, each of the first lens unit, the second lens unit, the third lens unit, the fourth lens unit, the fifth lens unit, the sixth lens unit, and the seventh lens unit moving during the zooming, the third lens unit being the first lens subunit, the fourth lens unit being the second lens subunit, and the fifth lens unit being the third lens subunit.

12. A zoom lens according to claim 8, wherein the zoom lens consists of, in order from an object side to an image side, a first lens unit having a negative refractive power, a second lens unit having a positive refractive power, a third lens unit having a negative refractive power, and a fourth lens unit having a positive refractive power, each of the first lens unit, the second lens unit, the third lens unit, and the fourth lens unit moving during the zooming, the second lens unit consisting of, in order from the object side to the image side, the first lens subunit, the second lens subunit, and a third lens subunit having a positive refractive power.

13. An image pickup apparatus, comprising:
a zoom lens; and
an image sensor configured to receive an image formed by the zoom lens,
wherein the zoom lens includes a plurality of lens units, in which an interval between adjacent lens units changes during zooming,
wherein the zoom lens includes a first lens subunit having a positive refractive power, a second lens subunit having a positive refractive power arranged adjacent to an image side of the first lens subunit, and at least one lens unit on an object side of the first lens subunit,
wherein lens systems arranged on the object side of the first lens subunit Lp1 have a negative combined focal length over an entire zoom range,
wherein the second lens subunit moves along an optical axis to the image side during focusing from an object at infinity to a proximate object, and
wherein the zoom lens satisfies the following conditional expression:

$1.0 < fp1/fp2 < 10.0$, where fp1 represents a focal length of the first lens subunit, and fp2 represents a focal length of the second lens subunit.

* * * * *